(12) United States Patent
Ishii et al.

(10) Patent No.: US 9,034,499 B2
(45) Date of Patent: May 19, 2015

(54) BATTERY COMPRISING MULTIPLE INSULATING COVERS

(71) Applicant: Kabushiki Kaisha Toshiba, Minato-ku (JP)

(72) Inventors: Hideyuki Ishii, Maebashi (JP); Eiki Kashiwazaki, Annaka (JP); Kengo Kurata, Saku (JP); Tatsuya Shinoda, Saku (JP); Tsutomu Matsui, Saku (JP); Yoshiaki Asami, Niiza (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/041,269

(22) Filed: Sep. 30, 2013

(65) Prior Publication Data

US 2014/0030562 A1      Jan. 30, 2014

Related U.S. Application Data

(62) Division of application No. 12/869,054, filed on Aug. 26, 2010, now Pat. No. 8,574,753.

(30) Foreign Application Priority Data

Aug. 27, 2009  (JP) ................................. 2009-197193
Aug. 27, 2009  (JP) ................................. 2009-197194

(51) Int. Cl.
*H01M 10/02*  (2006.01)
*H01M 10/04*  (2006.01)
(Continued)

(52) U.S. Cl.
CPC ............ *H01M 10/0431* (2013.01); *H01M 2/22* (2013.01); *H01M 2/263* (2013.01); *H01M 10/052* (2013.01); *H01M 10/0587* (2013.01)

(58) Field of Classification Search
CPC ....... H01M 10/02; H01M 10/04; H01M 2/02; H01M 2/14; H01M 2/26; H01M 2/30
USPC ......... 429/132, 185, 178, 175, 176, 162, 161, 429/142, 209, 94, 186, 133, 164
See application file for complete search history.

(56) References Cited

U.S. PATENT DOCUMENTS 5,773,164 A    6/1998   Venkatesan et al.
6,440,604 B1   8/2002   Inoue et al.
(Continued)

FOREIGN PATENT DOCUMENTS

JP    2003-7340 A     1/2003
JP    2003-77447 A    3/2003
(Continued)

OTHER PUBLICATIONS

Office Action issued on Jan. 7, 2014 in the corresponding Japanese Patent Application No. 2009-197194 (with English Translation).
(Continued)

*Primary Examiner* — Kenneth Douyette
(74) *Attorney, Agent, or Firm* — Oblon, McClelland, Maier & Neustadt, L.L.P.

(57) ABSTRACT

According to one embodiment, a battery includes an electrode group, a tab, a conductive nipping member, a case, a lid and a lead. The conductive nipping member includes first and second nipping sections. The first and second nipping sections divide the tab into two bundles in which portions of the tab are laminated onto each other in a thickness direction of the electrode group. The lead includes a connecting section connected electrically to a terminal, and current collecting sections which are two sections branched from the connecting section and sandwiching the nipping member.

10 Claims, 12 Drawing Sheets

(51) Int. Cl.
*H01M 2/02* (2006.01)
*H01M 2/14* (2006.01)
*H01M 2/26* (2006.01)
*H01M 2/30* (2006.01)
*H01M 2/22* (2006.01)
*H01M 10/052* (2010.01)
*H01M 10/0587* (2010.01)

(56) References Cited

U.S. PATENT DOCUMENTS

| | | |
|---|---|---|
| 2001/0049056 A1 | 12/2001 | Saito et al. |
| 2006/0051664 A1 | 3/2006 | Tasai et al. |
| 2006/0093910 A1 | 5/2006 | Yoon et al. |
| 2006/0222935 A1 | 10/2006 | Takahashi et al. |
| 2007/0154787 A1 | 7/2007 | Jang et al. |
| 2007/0196729 A1* | 8/2007 | Yamauchi et al. ............ 429/130 |
| 2008/0241702 A1* | 10/2008 | Takahashi ..................... 429/332 |
| 2009/0123835 A1* | 5/2009 | Kim et al. ..................... 429/185 |

FOREIGN PATENT DOCUMENTS

| | | |
|---|---|---|
| JP | 2003-151614 A | 5/2003 |
| JP | 2003-197174 | 7/2003 |
| JP | 2004-228078 A | 8/2004 |
| JP | 2004-303500 | 10/2004 |
| JP | 2006-40901 A | 2/2006 |
| JP | 2006-196276 | 7/2006 |
| JP | 2007-149353 | 6/2007 |
| JP | 2007-184238 A | 7/2007 |
| JP | 2007-226989 | 9/2007 |
| JP | 4134521 | 6/2008 |
| JP | 2009-87542 | 4/2009 |
| JP | 2009-87720 | 4/2009 |

OTHER PUBLICATIONS

Office Action mailed Feb. 12, 2014 in Japanese Application No. 2010-185570 (w/English translation).

* cited by examiner

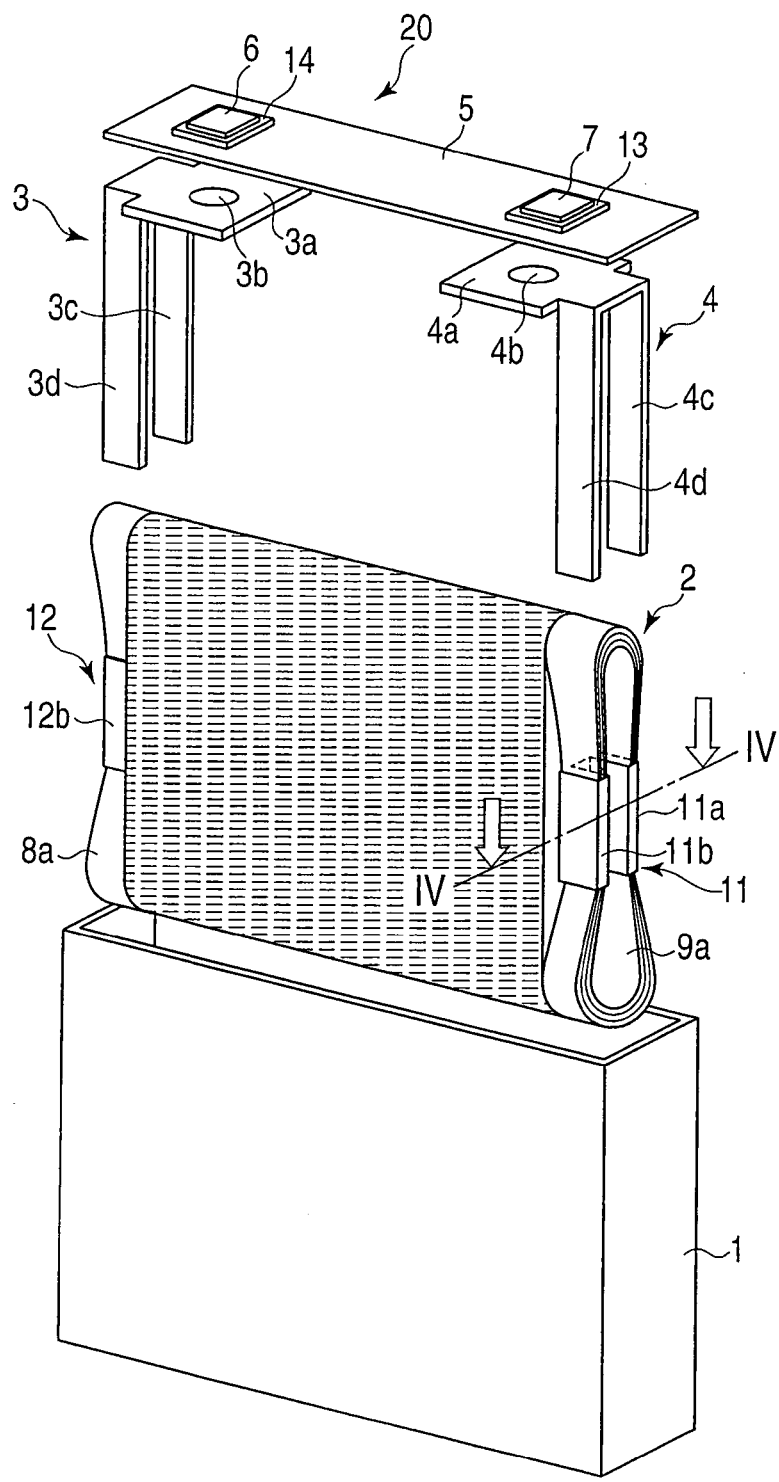
F I G. 1

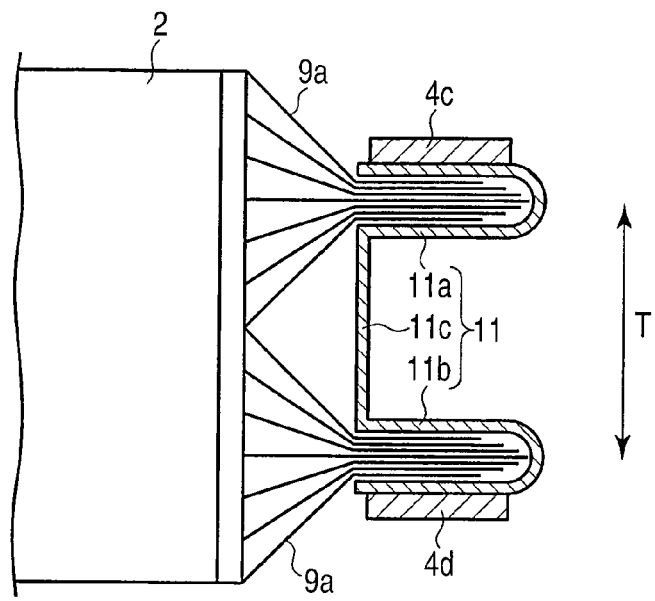
F I G. 4
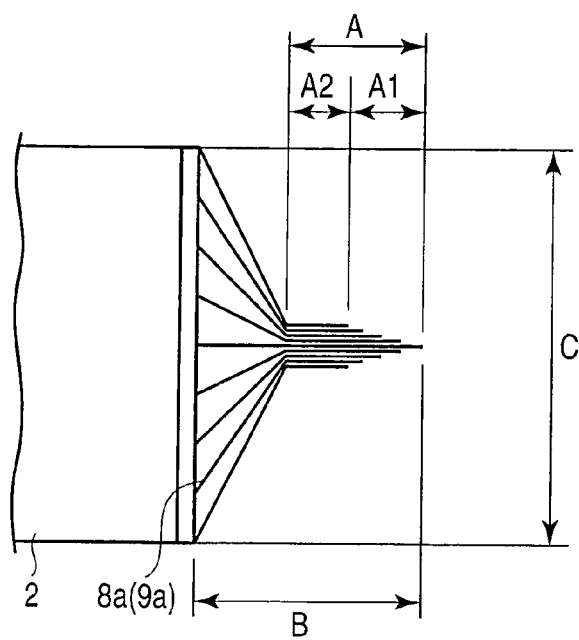
F I G. 5

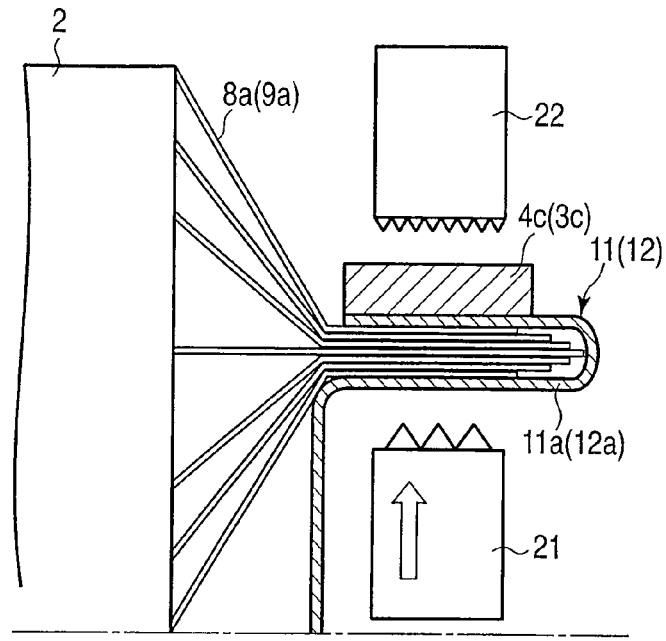
F I G. 6 A
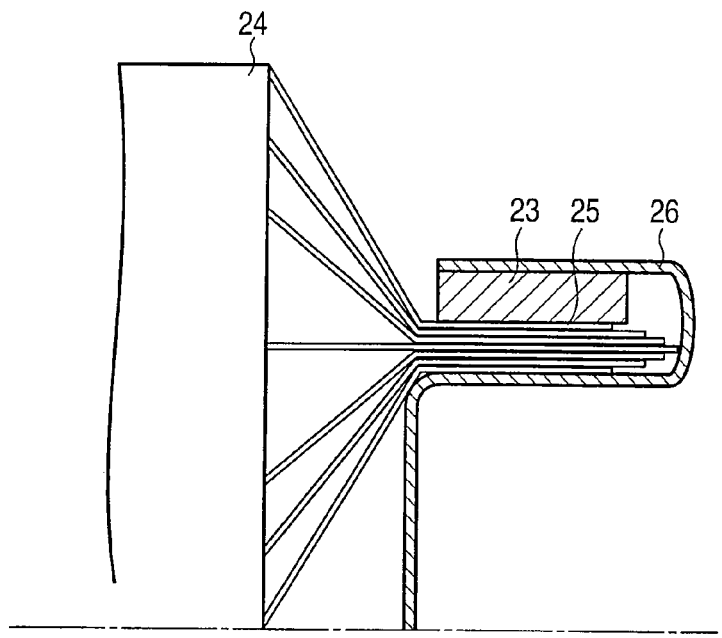
F I G. 6 B

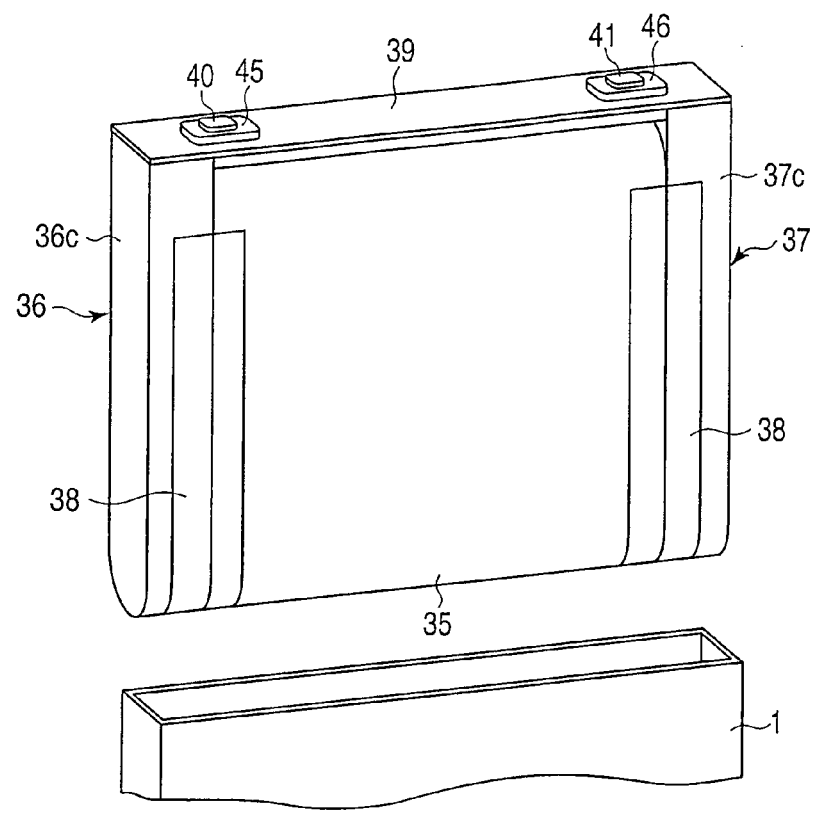
F I G. 8
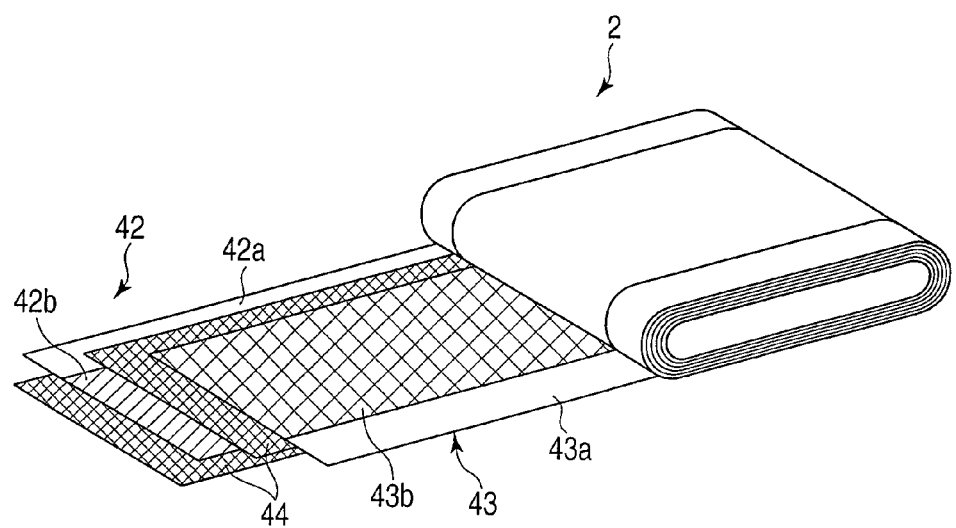
F I G. 9

BATTERY COMPRISING MULTIPLE INSULATING COVERS

CROSS-REFERENCE TO RELATED APPLICATIONS

This application is a division of and claims the benefit of priority under 35 U.S.C. §120 from U.S. Ser. No. 12/869,054 filed Aug. 26, 2010, now U.S Pat. No. 8,574,753, and claims the benefit of priority under 35 U.S.C. §119 from Japanese Patent Application Nos. 2009-197193 filed Aug. 27, 2009 and No. 2009-197194 filed Aug. 27, 2009; the entire contents of each of which are incorporated herein by reference.

FIELD

Embodiments described herein relate generally to a battery.

BACKGROUND

In recent years, with the progress of electronic instruments such as portable telephones and personal computers, secondary batteries used in these instruments have been required to have small size and light weight. High-energy-density secondary batteries that can satisfy the requirements are lithium ion secondary batteries. In the meantime, a secondary battery, such as a lead storage battery or a nickel hydrogen battery, has been used as a large-size and large-capacity power source. A typical example of the large-size and large-capacity power source is a power source for an electric vehicle, a hybrid car, an electric motorbike or a forklift. Recently, developments have been actively made to adopt a lithium ion secondary battery, which is high in energy density. In the developments, increases in the size and the capacity thereof have been advanced while an improvement in the cycle life, the safety and others has been taken into consideration.

As a power source for these vehicles or articles, use is made of a battery pack in which plural batteries connected in series or in parallel are held since the driving power thereof is large (see, for example, JP-A 2009-87542 (KOKAI), and JP-A 2009-87720 (KOKAI)).

The shape of sealed secondary batteries is generally a cylindrical shape or a rectangular shape. Attention has been paid, in particular, to rectangular sealed secondary batteries since the batteries are excellent in space efficiency when the batteries are each set into an instrument.

In a sealed secondary battery, use is made of, for example, a flat-shaped electrode group in which band-form positive and negative electrodes, in each of which an electrode active material layer is formed on each surface of a metal foil, are wound into a flat form with a band-form separator interposed therebetween. In order to take out electric energy generated by the flat-shaped electrode group, it is known that a metal foil area on which no electrode active material layer is formed is formed onto each of the positive and negative electrodes, and a lead or the like is joined to each of the areas to take out electric energy. Furthermore, for example, Japanese Patent No. 4134521, and JP-A 2003-197174 (KOKAI) disclose that individual metal foils are laminated/bundled on/with each other, and then leads or the like are welded to the foils in this state in order to enhance the current collecting efficiency.

In order to enhance the energy density of a battery, it is necessary that a larger volume of a flat-shaped electrode group be stored in a metal case. Moreover, it is feared that a large current flows into leads for collecting electric energy or sections for joining the leads, whereby heat is easily generated and at worst the battery may be damaged by the heat.

However, the batteries described in Japanese Patent No. 4134521, and JP-A 2003-197174 (KOKAI) do not sufficiently solve these problems.

BRIEF DESCRIPTION OF THE DRAWINGS

FIG. 1 is an exploded perspective view illustrating a rectangular secondary battery of a first embodiment;

FIG. 4 is an enlarged sectional view taken on line IV-IV in FIG. 1 as viewed along the direction of arrows;

FIG. 5 is a schematic view illustrating a state that portions of each of positive and negative electrode tabs are laminated onto each other in the electrode group;

FIG. 6A is a schematic view for comparing ultrasonic welding in the battery in FIG. 1 with ultrasonic welding in a Comparative Example;

FIG. 6B is a schematic view for comparing ultrasonic welding in the battery in FIG. 1 with ultrasonic welding in the Comparative Example;

FIG. 8 is a perspective view illustrating a step of storing an electrode group in the battery in FIG. 7 into a case;

FIG. 9 is an exploded perspective view illustrating the electrode group in FIG. 7;

DETAILED DESCRIPTION

Figure 2:
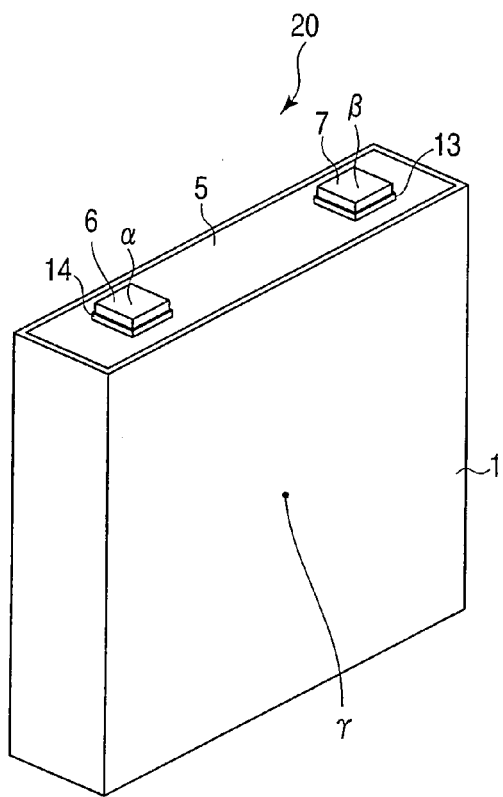
FIG. 2 is a perspective view illustrating the external appearance of the battery in FIG. 1.

In general, according to one embodiment, a battery includes an electrode group, a positive electrode tab, a negative electrode tab, a conductive positive electrode nipping member, a conductive negative electrode nipping member, a case, a lid, a positive electrode lead and a negative electrode lead.

The electrode group includes a positive electrode, a negative electrode and a separator. The positive electrode and the negative electrode are wound into a flat form with the separator interposed therebetween. The positive electrode includes a positive electrode current collector. The negative electrode includes a negative electrode current collector.

The positive electrode tab is a section of the positive electrode current collector projected into a spiral form from one end face of the electrode group. The negative electrode tab is a section of the negative electrode current collector projected into a spiral form from the other end face of the electrode group.

The conductive positive electrode nipping member includes first and second nipping sections and a linking section which connects the first and second nipping sections electrically to each other. The first and second nipping sections divide the positive electrode tab into two bundles in which portions of the tab are laminated onto each other in a thickness direction of the electrode group. The first and second nipping sections nip the bundles, respectively.

The conductive negative electrode nipping member includes first and second nipping sections and a linking section which connects the first and second nipping sections electrically to each other. The first and second nipping sections divide the negative electrode tab into two bundles in which portions of the tab are laminated onto each other in the thickness direction of the electrode group, and nip the bundles, respectively.

The electrode group is stored in the case. The lid is provided to an opening in the case, and the lid includes a positive electrode terminal and a negative electrode terminal.

The positive electrode lead includes a connecting section connected electrically to the positive electrode terminal, and current collecting sections which are two sections branched from the connecting section and sandwiching the positive electrode nipping member. One of the two sections is connected electrically to the first nipping section of the positive electrode nipping member. The other is connected electrically to the second nipping section.

The negative electrode lead includes a connecting section connected electrically to the negative electrode terminal, and current collecting sections which are two sections branched from the connecting section and sandwiching the negative electrode nipping member. One of the two sections is connected electrically to the first nipping section of the negative electrode nipping member. The other is connected electrically to the second nipping section.

According to the embodiment, a battery includes an electrode group, a positive electrode tab, a negative electrode tab, a case, a lid, a positive electrode lead, a negative electrode lead, an insulating tape, a first insulating cover and a second insulating cover.

The positive electrode lead includes one end which is electrically connected to the positive electrode terminal, and the other end which is electrically connected to the positive electrode tab. The negative electrode lead includes one end which is electrically connected to the negative electrode terminal, and the other end which is electrically connected to the negative electrode tab.

The insulating tape is arranged on an outermost circumference of the electrode group. The first insulating cover includes a resin molded product having a shape which covers areas of the positive electrode lead and the positive electrode tab which are areas opposed to an inside surface of the case. The second insulating cover includes a resin molded product having a shape which covers areas of the negative electrode lead and the negative electrode tab which are areas opposed to the inside surface of the case.

(First Embodiment)

A first embodiment provides a battery having a structure making the following possible: a larger volume of a flat-shaped electrode group is stored in a case to make the energy density high; and the resistances of connections of positive and negative electrode leads, and some other connection are restrained so that electric current can be effectively collected.

The first embodiment comprises the following structures (i) to (iii) in order to solve the above-mentioned problems: (i) a positive electrode tab is projected into a spiral form from one of the two end faces of an electrode group, and further a negative electrode tab is projected into a spiral form from the other end face; (ii) the positive and negative electrode tabs are each divided into two bundles in which portions of the tab are laminated onto each other in the thickness direction of the electrode group, and one of the bundles is nipped by a first nipping section of a nipping member while the other bundle is nipped by a second nipping section of the nipping member; and (iii) a current collector portion on which no active material layer is formed is used as each of the positive and negative electrode tabs. According to the structures (i) to (iii), it is possible to shorten the length of a portion of each of the positive and negative electrode tabs that is projected from a separator.

Positive and negative electrode leads connected electrically to positive and negative terminals formed in a lid, respectively. The positive and negative electrode leads comprises connecting sections connected to the positive and negative terminals, respectively; and two current collecting sections that are two sections branched from the corresponding connecting section and that sandwich the corresponding nipping member therebetween. One of the current collecting sections is electrically connected to the outside face of the first nipping section of the corresponding nipping member, and further the other is electrically connected to the outside face of the second nipping section thereof. The positive and negative electrode leads, which have the above-mentioned structures, can be arranged within the thickness of the flat-shaped electrode group.

According to the above-mentioned matters, the space of the case can be effectively used. As for the area where active material containing slurry is applied to the current collector, the slurry-applied width of the area can be kept larger. As a result, the short width of the tab can be kept smaller. In this way, the energy density of the battery of the embodiment, which may be a rectangular secondary battery, can be improved.

Moreover, the first and second nipping sections of each of the two nipping members are electrically connected to each other through a linking section, and further the positive or negative lead is electrically connected to the first and second nipping sections; therefore, tab-sections to be electrically connected to each of the leads can be located at two positions that are substantial evenly distributed in the thickness direction of the electrode group. In this way, a good current-collecting balance can be obtained.

Furthermore, since the first and second nipping sections of each of the nipping members are linked to each other through the linking section, a space can be certainly kept between the first and second nipping sections. Thus, when each of the positive and negative electrode leads, the corresponding nipping member, and the corresponding positive or negative electrode tab are welded to each other by ultrasonic welding, an ultrasonic welding horn or anvil can be certainly inserted and arranged into the space between the first and second nipping sections. As a result, the ultrasonic welding can easily be attained. It is allowable to arrange, in the space, either the ultrasonic welding horn or the anvil in accordance with conditions for the welding.

With reference to the drawings, the battery according to the first embodiment will be described hereinafter. The invention is not limited to this embodiment.

A battery 20 illustrated in FIGS. 1 and 2 is a sealed, rectangular, nonaqueous electrolyte secondary battery. The battery 20 comprises a case 1, a flat-shaped electrode group 2 stored in the case 1, positive and negative electrode leads 3 and 4 positioned in the case 1, a lid 5 provided to an opening in the case 1, and positive and negative electrode terminals 6 and 7 provided on the lid 5.

The case 1 has a bottomed, rectangular cylindrical shape, and is made of, for example, a conductive material such a metal and an alloy. Examples of the conductive material include aluminum, an aluminum alloy, iron and stainless steel. An electrolytic solution (not illustrated) is stored in the case 1, and the flat-shaped electrode group 2 is impregnated with the electrolytic solution.

Figure 3:
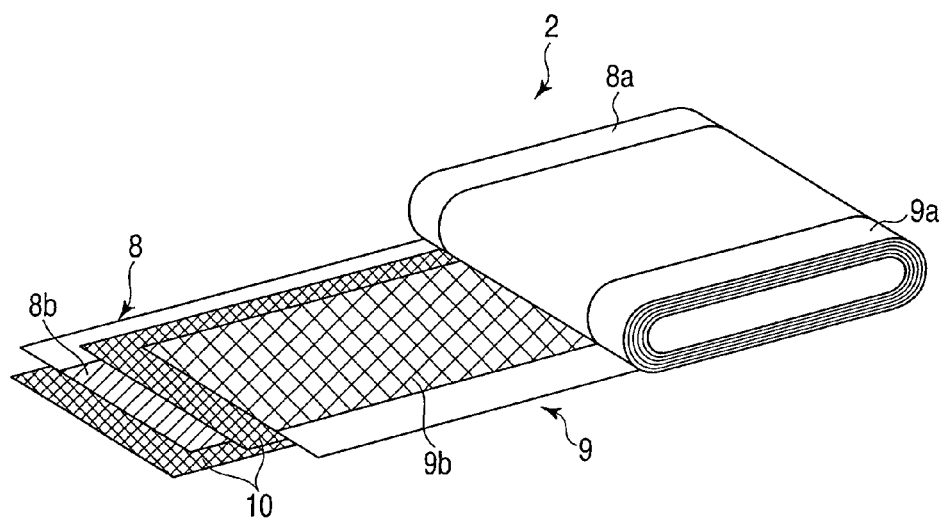
FIG. 3 is an exploded perspective view of an electrode group used in the battery in FIG. 1.

As illustrated in FIG. 3, the flat-shaped electrode group 2 is a member in which a positive electrode 8 and a negative electrode 9 are wound into a flat form with a separator 10 interposed therebetween. The positive electrode 8 contains a band-form positive electrode current collector made of, for example, metal foil, a positive electrode tab 8a made of an end section of the positive electrode current collector that is parallel to long sides of the collector, and a positive electrode active material layer 8b formed onto an area of the positive electrode current collector other than at least the positive electrode tab 8a area. The negative electrode 9 contains a band-form negative electrode current collector made of, for example, metal foil, a negative electrode tab 9a made of an end section of the negative electrode current collector that is parallel to long sides of the collector, and a negative electrode active material layer 9b formed onto an area of the negative electrode current collector other than at least the negative electrode tab 9a area.

The positive electrode 8, the separators 10 and the negative electrode 9 are wound to deviate the positions of the positive electrode 8 and the negative electrode 9 from each other such that the positive electrode tab 8a is projected from the separators 10 in one direction along the winding axis of the electrode group, and further the negative electrode tab 9a is projected from the separators 10 in the other direction, which is opposite to the above-mentioned direction. As illustrated in FIG. 1, according to the winding, as for the electrode group 2, the positive electrode tab 8a wound into a spiral form is projected from one of the two end faces, and further the negative electrode tab 9a wound into a spiral form is projected from the other end face.

As illustrated in FIG. 4, the negative electrode tab 9a is divided into two bundles in each of which portions of the tab are laminated onto each other in the thickness direction T of the electrode group. Specifically, the boundary between the bundles is a space which is positioned inside the wound tab portions and in the vicinity of the center of the electrode group 2. A winding core may be inserted in the space when the electrode group is formed. The portions of each of halves of the tab 9a are laminated onto each other in the thickness direction. In this way, the two bundles of the portions of the negative electrode tab 9a are formed. The conductive negative electrode nipping member 11 comprises first and second nipping sections 11a and 11b that are each in the form of reverse "C", and a linking section 11c connected electrically to the first and second nipping sections 11a and 11b. The linking section 11c is positioned between the first and second nipping sections 11a and 11b, and causes the sections 11a and 11b to be linked to each other such that the sections 11a and 11b are continuous with each other in the thickness direction of the electrode group 2.

One of the bundles of the portions of the negative electrode tab 9a is nipped by the first nipping section 11a so as to be held thereby. The other bundle of the portions of the negative electrode tab 9a is nipped by the second nipping section 11b so as to be held thereby. The method for electrically connecting the negative electrode tab 9a to the first and second nipping sections 11a and 11b is not particularly limited, and may be, for example, ultrasonic welding.

In the same manner as in the case of the negative electrode tab 9a, the positive electrode tab 8a is divided into two bundles in each of which portions of the tab are laminated onto each other in the thickness direction T of the electrode group. As illustrated in FIG. 1, the conductive positive electrode nipping member 12 comprises first and second nipping sections 12a and 12b (the section 12a being not illustrated) that are each in the form of reverse "C", and a linking section (not illustrated) connected electrically to the first and second nipping sections 12a and 12b. The linking section is positioned between the first and second nipping sections 12a and 12b, and causes the sections 12a and 12b to be linked to each other such that the sections 12a and 12b are continuous with each other in the thickness direction of the electrode group 2.

One of the bundles of the portions of the positive electrode tab 8a is nipped by the first nipping section 12a so as to be held thereby. The other bundle of the portions of the positive electrode tab 8a is nipped by the second nipping section 12b so as to be held thereby. The method for electrically connecting the positive electrode tab 8a to the first and second nipping sections 12a and 12b is not particularly limited, and may be, for example, ultrasonic welding.

As illustrated in FIG. 1, the negative electrode lead 4 comprises a connecting plate 4a to be connected electrically to the negative electrode terminal 7, a through hole 4b made in the connecting plate 4a, and strip-form current collecting sections 4c and 4d that are two sections branched from the connecting plate 4a so as to extend downward. The positive electrode lead 3 comprises a connecting plate 3a to be connected electrically to the positive electrode terminal 6, a through hole 3b made in the connecting plate 3a, and strip-form current collecting sections 3c and 3d that are two sections branched from the connecting plate 3a so as to extend downward.

As illustrated in FIGS. 1 and 4, as for the negative electrode lead 4, the negative electrode nipping member 11 is sandwiched between its current collecting sections 4c and 4d. The current collecting section 4c is arranged onto the outside face of the first nipping section 11a of the negative electrode nipping member 11 while the current collecting section 4d is arranged onto the outside face of the second nipping section 11b. The outside faces of the first and second nipping sections 11a and 11b cover outermost circumferential surfaces of the bundles of the portions of the negative electrode tab 9a. Between the portions of the negative electrode tab 9a nipped by the first nipping section 11a, electrically connecting is attained by, for example, ultrasonic welding, as well as between the bundle of the portions of the negative electrode tab 9a and the first nipping section 11a, and between the first nipping section 11a and the current collecting section 4c. Between the portions of the negative electrode tab 9a nipped by the second nipping section 11b, electrically connecting is attained by, for example, ultrasonic welding, as well as between the other bundle of the portions of the negative electrode tab 9a and the second nipping section 11b, and between the second nipping section 11b and the current collecting section 4d. In this way, the negative electrode 9 of the electrode group 2 is electrically connected to the negative electrode lead 4 through the negative electrode tab 9a.

In the same manner as in the case of the negative electrode lead 4, as for the positive electrode lead 3, the positive electrode nipping member 12 is sandwiched between its current collecting sections 3c and 3d. The current collecting section 3c is arranged onto the outside face of the first nipping section 12a of the positive electrode nipping member 12 while the current collecting section 3d is arranged onto the outside face of the second nipping section 12b. The outside faces of the first and second nipping sections 12a and 12b cover outermost circumferential surfaces of the bundles of the portions of the positive electrode tab 8a. Between the portions of the positive electrode tab 8a nipped by the first nipping section 12a, electrically connecting is attained by, for example, ultrasonic welding, as well as between the bundle of the portions of the positive electrode tab 8a and the first nipping section 12a, and between the first nipping section 12a and the current collecting section 3c. Between the portions of the positive electrode tab 8a nipped by the second nipping section 12b, electrically connecting is attained by, for example, ultrasonic welding, as well as between the other bundle of the portions of the positive electrode tab 8a and the second nipping section 12b, and between the second nipping section 12b and the current collecting section 3d. In this way, the positive electrode 8 of the electrode group 2 is electrically connected to the positive electrode lead 3 through the positive electrode tab 8a.

The positive and negative electrode nipping members 11 and 12 may be made of a conductive material such as metal.

It is desired that the thickness of each of the first and second nipping sections 12a and 12b of the positive electrode nipping member 12 is smaller than that of the positive electrode lead 3 and further the thickness of each of the first and second nipping sections 11a and 11b of the negative electrode nipping member 11 is smaller than that of the negative electrode lead 4. This makes it possible to nip the bundled portions by each of the first and second nipping sections easily and weld the bundled portions easily so as to lower the resistances of the connections between the first and second nipping sections and the tabs.

In the meantime, as illustrated in FIG. 1, the negative electrode terminal 7 is attached to the lid 5 by, for example, caulking, with an insulating gasket 13 interposed therebetween. The negative electrode terminal 7 is electrically connected also to a through hole 4b in the negative electrode lead 4 by caulking. In this manner, the negative electrode terminal 7 is electrically connected to the negative electrode 9 of the electron group 2 through the negative electrode lead 4. The positive electrode terminal 6 is attached to the lid 5 by, for example, caulking, with an insulating gasket 14 interposed therebetween. The positive electrode terminal 6 is electrically connected also to a through hole 3b in the positive electrode lead 3 by caulking. In this manner, the positive electrode terminal 6 is electrically connected to the positive electrode 8 of the electron group 2 through the positive electrode lead 3.

As illustrated in FIG. 2, the lid 5 is attached to an opening in the case 1 by seam-welding through laser. The lid 5 is made of a conductive material such a metal and an alloy. Examples of the conductive material include aluminum, an aluminum alloy, iron and stainless steel. The lid 5 and the case 1 are desirably made of a material of the same kind.

As illustrated in FIG. 5, when a positive electrode or negative electrode lead for current collection or the like is joined to a lamination portion A including plural portions of a tab 8a (9a) made of metal foil, it is ideal for the outermost layer of the lamination portion A that only a planar section A2 is formed. However, when the portions are bundled to be laminated onto each other, a deviation A1 between the outermost circumferential portion of the tab 8a (9a) and the innermost circumferential portion of the tab 8a (9a) is generated. For example, when all portions of the tab 8a (9a) of the flat-shaped electrode group 2 are bundled to each other at a single position and then in this state a lead for current collection or the like is joined to the tab, the degree of the deviation A1 between the tab portions becomes larger as the thickness C of the flat-shaped electrode group 2 is larger than a certain length B of the tab 8a (9a). The lamination end section of the bundled tab unfavorably turns into a step form. Thus, the planar section A2 is hardly generated so that a planar outermost layer of the lamination portion A cannot be formed. In order to avoid this, for example, the length B of the tab 8a (9a) is made large, thereby making it possible to make the proportion of the planar section A2 large. However, if the length B of the tab 8a (9a) is made large, it is necessary to secure a space which the long tab 8a (9a) occupies inside the case 1. As a result, the occupation ratio of the flat-shaped electrode group 2 decreases, so that the space efficiency tends to be worse to lower the energy density.

In order to obtain the planar outermost layer of the lamination portion A while the length of the tab 8a (9a) is made as short as possible, all portions of the tab 8a (9a) are not bundled at a single position, but all the portions of the tab 8a (9a) are divided and bundled into two or more units, as illustrated in FIG. 4. In this way, the deviation A1 between portions of the tab is restrained and further the proportion of the planar section A2 is made larger, whereby the tab can be made into a good state for a lead-connecting surface. As the number of positions for bundling the divided portions is made larger, the deviation A1 between the portions of the tab becomes smaller. However, if the number of the bundling positions is plural, it is actually difficult in many cases for current collecting leads or the like to be joined to the positions. The number of components to be used also increases, and the method for the joining becomes complicated. Thus, the battery lacks fabrication easiness. Additionally, it also becomes necessary to secure spaces for the joining accordingly, so that the space efficiency is lowered. As a result, costs increase.

In light of these matters, in order to generate the simplest and best situation for the efficiency of current collection, the fabrication easiness, the simplification of the shapes of components to be used, and others, it can be concluded that the number of the positions where all the portions of the tab 8a (9a) are separately bundled should be set to two for each of the positive electrode and the negative electrode.

As for the positive electrode tab 8a, as well as the negative electrode tab 9a, the portions of the tab are laminated onto each other in the thickness direction of the electrode group and the portions of the tab are divided into two bundles. In this way, two bundles are formed for each of the positive and negative electrodes. The two bundles are nipped and held by the first and second nipping sections, respectively, so that a space can be secured within the scope of the thickness of the flat-shaped electrode group 2. This space is effectively used to arrange the positive and negative electrode leads 3 and 4 in the thickness direction of the electrode group 2 so as to be along the bundled tab portions. Thus, different spaces for leading the current collecting leads around may not be secured. As a result, the ratio by volume of the flat-shaped electrode group 2 in the case 1 can be made large. There is, for example, a secondary battery having a structure in which current collecting leads or the like are arranged on side faces in the width direction of a flat-shaped electrode group. In this case, however, it is naturally necessary to secure spaces for leading the current collecting leads or the like around on both ends in the flat-shaped electrode group. It is evident that the arrangement of the positive and negative electrode leads 3 and 4 according to the embodiments is better in effective space-use than such techniques.

As long as the width and thickness of the positive and negative electrode leads 3 and 4 are sizes permitting the leads 3 and 4 to be stored in the spaces secured within the thickness of the flat-shaped electrode group 2, the battery can fulfill electrically and mechanically sufficient functions.

The positive electrode tab 8a, as well as the negative electrode tab 9a, is made into the state that the portions of the tab are laminated onto each other in the thickness direction of the electrode group and the portions of the tab are divided into two bundles. In this way, the length B of each of the positive and negative electrode tabs 8a and 9a projected from the separator 10 at each of the two end face sections of the electrode group 2 can be made shorter than the length B in the state that portions of each of the positive and negative electrode tabs 8a and 9a are bundled into each other at one position for the above-mentioned reason. When the length B, which is a length of the positive or negative electrode tab 8a or 9a required for electrically connecting the positive or negative electrode lead 3 or 4, or the like, is controlled into a minimum value, the electrode section where the electrode active material layer of each of the positive and negative electrodes 8 and 9 of the flat-shaped electrode group 2 is formed, can be made broad in the width direction.

Furthermore, the current collecting sections 3c and 3d of the positive electrode lead 3 are arranged on the outside surfaces of the first and second nipping sections 12a and 12b of the positive electrode nipping member 12, respectively, the outside surfaces being each positioned outside each of the two bundled portions of the positive electrode tab 8a; and the current collecting sections 4c and 4d of the negative electrode lead 4 are arranged on the outside surfaces of the first and second nipping sections 11a and 11b of the negative electrode nipping member 11, respectively, the outside surfaces being each positioned outside each of the two bundled portions of the negative electrode tab 9a. This arrangement makes it possible to arrange the positive and negative electrode leads 3 and 4 within the thickness of the flat-shaped electrode group 2. The positive and negative electrode leads 3 and 4 having this structure each have not one but two nipping-member-connecting sections in the thickness direction of the flat-shaped electrode group 2. Thus, the battery has the connecting sections at positions distributed substantial evenly to respective halves of the circumference of the wound-state electrode section (where the active material is held) of each of the positive and negative electrodes; moreover, the current collecting distance becomes short accordingly. As a result, the battery has a good current collecting balance.

As for each of the positive and negative electrodes, the current collector of the lead is branched into two sections (current collecting sections), so that the two sections are electrically connected to the nipping members, respectively. Thus, even when a large electric current is caused to flow into the battery to generate heat, the heat hardly concentrates on the individual connections or the lead itself. Thus, the battery can keep a good state also for electric property. The shape of each of the positive and negative electrode leads 3 and 4, which includes the shape of the branched sections also, is a single-unit shape. Thus, from the connection between the positive electrode terminal 6 or negative electrode terminal 7 and one of the leads 3 and 4 to the connection between the lead and the nipping member 11 or 12, no other connection is disposed. Therefore, it can be concluded that the battery has an electrically and mechanically reliable structure.

Furthermore, the first nipping sections 11a and 12a of the negative and positive electrode nipping members 11 and 12 are linked to the second nipping sections 11b and 12b thereof, respectively, through linking sections each in the form of reverse C, so that spaces can be secured between the first and second nipping sections 11a and 11b and between the first and second nipping sections 12a and 12b, respectively. Also when the positive and negative electrode leads 3 and 4 are welded to the tabs by ultrasonic welding, ultrasonic welding horns or anvils can be certainly inserted and arranged in the spaces. Thus, the ultrasonic welding can easily be attained. Since the plural sheet-like portions of each of the tabs are nipped by the first or second nipping section and then the ultrasonic welding is performed, the tab does not directly receive amplitude energy of the ultrasonic waves and the tab is not melted to be torn off or scattered. Thus, good lead-connecting sections can be formed.

Ultrasonic welding is a technique which comprises pressing joining surfaces of materials onto each other so that an oxide film thereon is removed and the joining surfaces are made close to each other so as to have only an atomic distance therebetween; and conducting vibration energy from a horn to the surfaces appropriately and certainly, thereby welding the surfaces onto each other. Thus, it is preferable that vibration energy conduct appropriately and certainly to the joining surfaces without sliding nor shifting each of the materials on the contact surface of the horn or the anvil. In general, irregularities in the form of mountains are formed in the contacting surface of the horn or the anvil in order to prevent the sliding and maintain grasping force.

FIG. 6A shows an embodiment of ultrasonic welding between the current collecting section 3c (4c) of the positive or negative electrode lead 3 or 4, and the first nipping section 11a or 12a of the battery in FIG. 1. An inside/outside-arrangement relationship between a horn 21 and an anvil 22 does not matter; in FIG. 6A, the horn 21 and the anvil 22 are arranged inside and outside, respectively. FIG. 6B shows a case where a lead 23 and plural sheet-form portions of a current collecting metal foil 25 that are projected from an end face of a power generating element 24 are put onto each other, and the resultant is sandwiched between portions of the sandwiching plate 26 that are opposed to each other, as described in JP-A 2003-197174 (KOKAI).

As illustrated in FIG. 6A, in a case where the nipping members 11 and 12 are arranged inside the positive and negative electrode leads 3 and 4, surfaces joined to each other by ultrasonic welding are contact surfaces between the current collecting section 3c (4c) of the positive or negative electrode lead 3 or 4 and the nipping member 11 or 12, contact surfaces between portions of the positive or negative electrode tab 8a or 9a nipped by the nipping section 11 or 12, and contact surfaces between the tab 8a or 9a and the nipping member 11 or 12. By contrast, in the case illustrated in FIG. 6B, surfaces joined to each other by ultrasonic welding are contact surfaces between the lead 23 and the current collecting metal foil 25, and contact surfaces between the laminated portions of the current collecting metal foil 25, and contact surfaces between the current collecting metal foil 25 and a sandwiching plate 26. An optimal arrangement of a horn and an anvil is as follows: the horn and anvil are arranged to be brought into direct contact with materials that should be caused to have bonding surfaces at their surfaces opposite to the bonding surfaces, and grasp the materials. When the sandwiching plate 26 is arranged outside the lead 23 as illustrated in FIG. 6B, the horn or anvil can neither contact nor grasp the lead 23 directly, so that the lead 23 itself may get out of position. Thus, it cannot be said that appropriate energy conduction to the bonding surfaces is attained. The reliability in bonding strength is poorer than when the nipping member 11 or 12 is arranged inside the positive or negative electrode lead 3 or 4 as illustrated in FIG. 6A.

When the sandwiching plate 26 is arranged outside the lead 23, it is unavoidable that in a single step, a work for positioning the lead 23 is conducted while the current collecting metal foil 25 portions are bundled. Thus, the difficulty of the work increases, so as to raise the possibility that the current collecting metal foil 25 gets out of position. It is also essential to carry out a work for the ultrasonic welding in the same step. Much time is required for the works in the step. As a result, the difference in working time between this step and steps before and after the step becomes large so that the line balance becomes bad.

When the nipping members 11 and 12 are arranged inside the positive and negative electrode leads 3 and 4, respectively, as illustrated in FIG. 6A, the bundling of the portions of the positive and negative electrode tabs 8a and 9a, the positioning thereof, and the ultrasonic welding work can be separately attained. Thus, the line balance is good, and the battery has a reasonable shape in light of the fabrication easiness of the battery.

Typical examples of the materials of the positive and negative electrode terminals are described herein. In the case of a lithium ion secondary battery using a carbon-based material as a negative electrode active material, aluminum or an aluminum alloy is preferably used for the positive electrode terminal while a metal such as copper, nickel or iron plated with nickel is preferably used for the negative electrode terminal. When lithium titanate is used as the negative electrode active material, it is allowable to use, besides the above, aluminum or an aluminum alloy for the negative electrode terminal. When aluminum or an aluminum alloy is used for the positive and negative electrode terminals, it is desired that the positive and negative electrode tabs, the positive and negative electrode nipping members and the positive and negative electrode leads are made of aluminum or the aluminum alloy.

The following will describe the positive electrode, the negative electrode, the separators and the electrolytic solution used in the rectangular nonaqueous electrolyte secondary battery in FIG. 1.

The positive electrode is formed by applying a slurry containing a positive electrode active material onto a current collector made of aluminum foil or aluminum alloy foil. The positive electrode active material is not particularly limited, and may be an oxide, a sulfide, a polymer or some other material capable of adsorbing and releasing lithium. Preferred examples of the active material include lithium-manganese composite oxide, lithium-nickel composite oxide, lithium-cobalt composite oxide, and lithium iron phosphate, which each give a high positive electrode potential. The negative electrode is formed by applying a slurry containing a negative electrode active material onto a current collector made of aluminum foil or aluminum alloy foil. The negative electrode active material is not particularly limited, and may be a metal oxide, a metal sulfide, a metal nitride, an alloy or some other material capable of adsorbing and releasing lithium. The active material is preferably a substance having a nobler potential for adsorbing and releasing lithium ions than the potential of metallic lithium by 0.4 V or more. Since the negative electrode active material having such a potential for adsorbing and releasing lithium ions restrains alloy-reaction between aluminum or any aluminum alloy and lithium, aluminum or an aluminum alloy can be used for the negative electrode current collector and negative-electrode-related constituting members. Examples thereof include titanium oxide, lithium-titanium composite oxides such as lithium titanate, tungsten oxide, amorphous tin oxide, tin silicon oxide, and silicon oxide. Of these examples, lithium-titanium composite oxide is preferred. The separators may each be, for example, a finely porous membrane, a woven cloth piece or a nonwoven cloth piece, or a laminated product in which the same or different kind members each selected from these examples are laminated onto each other. Examples of the material that forms the separators include polyethylene, polypropylene, ethylene-propylene copolymer, and ethylene-butene copolymer.

The electrolytic solution may be a nonaqueous electrolytic solution prepared by dissolving an electrolyte (for example, a lithium salt) in an nonaqueous solvent. Examples of the nonaqueous solvent include ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofuran. As for the nonaqueous solvent, a single solvent may be used, or two or more solvents may be used in a mixture form. Examples of the electrolyte include lithium perchlorate ($LiClO_4$), lithium hexafluorophosphate ($LiPF_6$), lithium borofluoride ($LiBF_4$), lithium hexafluoroarsenate ($LiAsF_6$) and lithium trifluoromethasulfonate ($LiCF_3SO_3$). These electrolytes may be used either alone or as mixture of two or more types. The amount of the electrolyte dissolved in the nonaqueous solvent may be in the range of 0.2 to 3 mol/L.

As described above, according to the first embodiment, positive and negative electrode leads are each made into a form branched into two sections, and the leads are arranged inside a case with a good space efficiency. This makes it possible for a larger volume of a flat-shaped electrode group to be stored in the case so as to give a higher energy density. The positive and negative electrode leads are each branched so that its portion to be electrically connected to the flat-shaped electrode group is dispersed into two points. This makes it possible for the electrode group to have a structure in which even when a large electric current is caused to flow into the electrode group to generate heat, the heat is not easily concentrated. At the same time, the electrode group has the connections at positions distributed substantial evenly in the electrode sections of the flat-shaped electrode group, so as to have a structure excellent in current collecting balance. Furthermore, the positive and negative electrode tabs of the flat-shaped electrode group are each nipped by a nipping member, thereby forming favorable connections. Ultrasonic welding that is a method for the electrically connecting can also be performed with ease.

The first embodiment can provide a battery having a structure making the following possible: a larger volume of a flat-shaped electrode group is stored in a case to give a high energy density; and the resistances of connections of positive and negative electrode leads, and some other section are restrained so that electric current can be effectively collected.

(Second to Fourth Embodiments)

An object of second to fourth embodiments is to improve a volume efficiency of a battery having a structure in which an electrode group, tabs and leads are electrically insulated from a case.

With reference to the drawings, the batteries according to the second to fourth embodiments will be described hereinafter. The invention is not limited to these embodiments.

(Second Embodiment)

Figure 7:
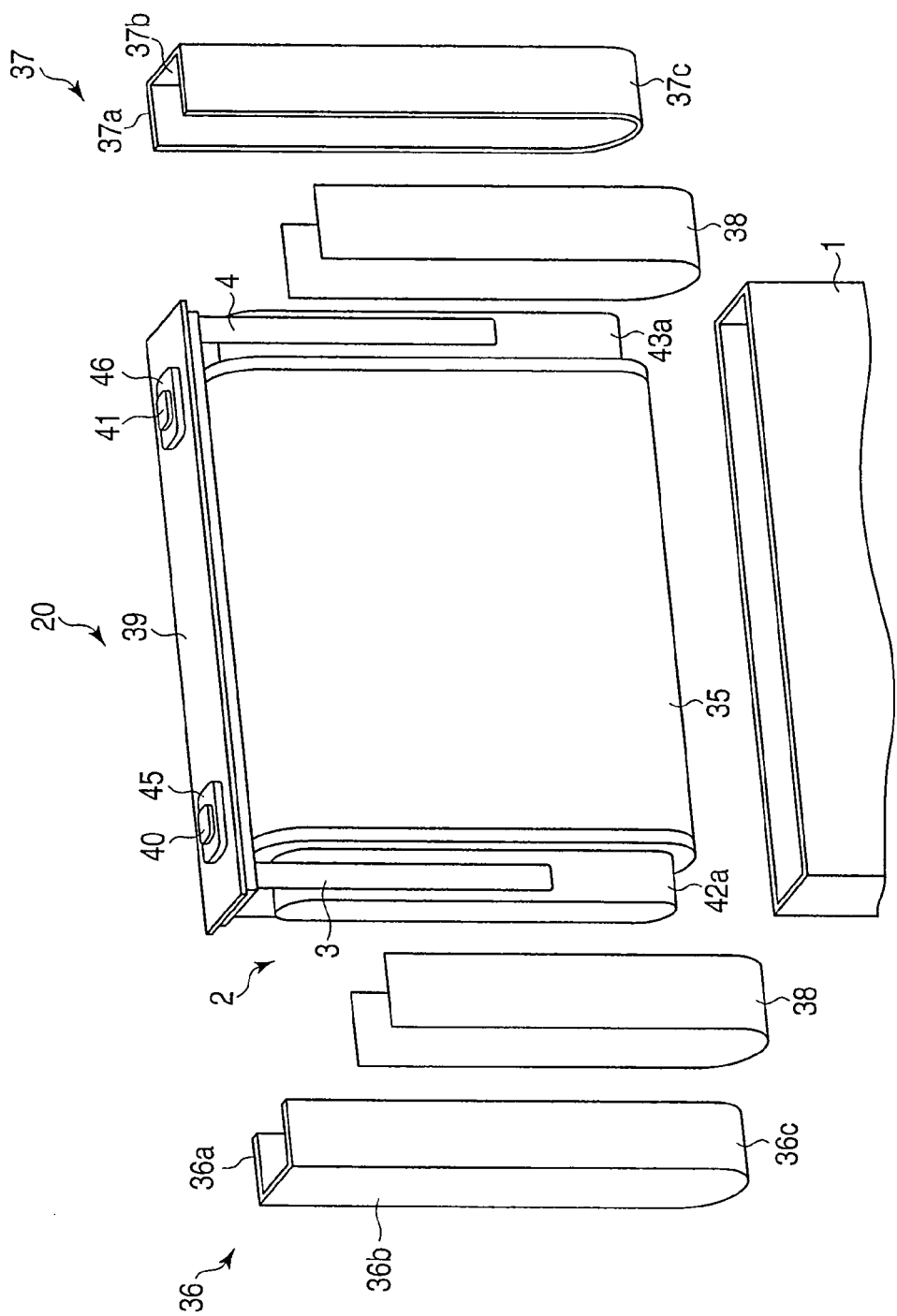
FIG. 7 is an exploded perspective view illustrating a battery of a second embodiment.

A battery 20 illustrated in FIGS. 7 and 8 is a sealed, rectangular, nonaqueous electrolyte secondary battery. The battery 20 comprises a case 1, a flat-shaped electrode group 2 stored in the case 1, positive and negative electrode leads 3 and 4 positioned in the case 1, an insulating tape 35 covering the outermost circumference of the electrode group 2, a first insulting cover 36, a second insulating cover 37, an insulating cover fixing tape 38, a lid 39 provided to an opening in the case 1, and positive and negative electrode terminals 40 and 41 provided on the lid 39.

The case 1 has a bottomed, rectangular cylindrical shape, and is made of, for example, a conductive material such a metal and an alloy. Examples of the conductive material include aluminum, an aluminum alloy, iron and stainless steel. An electrolytic solution (not illustrated) is stored in the case 1, and the flat-shaped electrode group 2 is impregnated with the electrolytic solution.

As illustrated in FIG. 9, the flat-shaped electrode group 2 is a member in which a positive electrode 42 and a negative electrode 43 are wound into a flat form with a separator 44 interposed therebetween. The positive electrode 42 contains a band-form positive electrode current collector made of, for example, metal foil, a positive electrode tab 42a made of an end section of the positive electrode current collector that is a section parallel to long sides of the collector, and a positive electrode active material layer 42b formed onto an area of the positive electrode current collector other than at least the positive electrode tab 42a area thereof. The negative electrode 43 contains a band-form negative electrode current collector made of, for example, metal foil, a negative electrode tab 43a made of an end section of the negative electrode current collector that is a section parallel to long sides of the collector, and a negative electrode active material layer 43b formed onto an area of the negative electrode current collector other than at least the negative electrode tab 43a area thereof.

The positive electrode 42, the separators 44 and the negative electrode 43 are wound to deviate the positions of the positive electrode 42 and the negative electrode 43 from each other such that the positive electrode tab 42a is projected from the separators 44 in one direction along the winding axis of the electrode group, and further the negative electrode tab 43a is projected from the separators 44 in the other direction, which is opposite to the above-mentioned direction. As illustrated in FIG. 7, by the winding, the positive electrode tab 42a wound in a spiral form is projected from one end face of the electrode group 2, and further the negative electrode tab 43a wound in a spiral form is projected from the other end face.

As illustrated in FIG. 7, one end of the positive electrode lead 3 is electrically connected to the positive electrode tab 42a of the electrode group 2 by, for example, ultrasonic welding. The other end (not illustrated) of the positive electrode lead 3 is electrically connected to the positive electrode terminal 40. One end of the negative electrode lead 4 is electrically connected to the negative electrode tab 43a of the electrode group 2 by, for example, ultrasonic welding. The other end (not illustrated) of the negative electrode lead 4 is electrically connected to the negative electrode terminal 41.

The adhesive insulating tape 35 insulates the outermost circumference of the electrode group 2 electrically from the case 1. In FIG. 7, the insulating tape 35 adheres closely to the outermost circumference of the electrode group 2 to cover a single circumference of the outermost circumference. This tape 35 has both a function of keeping the winding of the wound electrode group 2, and a function of insulating the electrode group 2 and the case 1 from each other. This causes a reduction in the number of components to be used, so as to contribute to a decrease in costs. An insulating material other than insulating covers is not newly required, and the electrode group 2 is easily inserted into the case 1. The size of the electrode group can be made large up to the internal size of the case 1. This contributes to an improvement in volume efficiency. Since the positive and negative electrode tabs 42a and 43a at both ends of the electrode group 2 are not covered with the insulating tape 35, the tape 35 does not hinder the impregnation of electrolytic solution. The number of circumferences to be wound by the insulating tape 35 may be set 1 or more. In the embodiment, the electrode group 2 is spirally wound to be flat; however, the embodiments may be applied to an electrode group in a lamination form.

Examples of resin that may be used for the substrate of the insulating tape 35 include polyesters (such as PET), polyimide, polyphenylene sulfide (PPS), and polypropylene.

The first insulating cover 36 is a resin molded product having a shape covering areas of the positive electrode lead 3 and the positive electrode tab 42a that are areas opposed to the inside surface of the case 1. Specifically, the first insulating cover 36 is a flat cap surrounding an end face of the positive electrode tab 42a, and an area of the positive electrode tab 42a outermost circumference that is opposed to the inside surface of the case 1. In the cover 36, its section opposed to the inside surface of the lid 39 is cut out, so that an opening 36a is made. In other words, the first insulating cover 36 comprises the opening 36a, a side plate 36b covering the end face of the positive electrode tab 42a, and a side plate 36c curved into a U-shaped form to cover the outermost circumference of the positive electrode tab 42a.

The second insulating cover 37 is a resin molded product having a shape which covers areas of the negative electrode lead 4 and the negative electrode tab 43a that are areas opposed to the inside surface of the case 1. Specifically, the second insulating cover 37 is a flat cap surrounding an end face of the negative electrode tab 43a, and an area of the negative electrode tab 43a outermost circumference that is opposed to the inside surface of the case 1. In the cover 37, its section opposed to the inside surface of the lid 39 is cut out, so that an opening 37a is made. In other words, the second insulating cover 37 comprises the opening 37a, a side plate 37b covering the end face of the negative electrode tab 43a, and a side plate 37c curved into a U-shaped form to cover the outermost circumference of the negative electrode tab 43a.

The first insulating cover 36 has both a function of protecting an ultrasonic-welded section of the positive electrode lead 3 and the positive electrode tab 42a from vibration or impact, and a function of insulating the positive electrode lead 3 and the positive electrode tab 42a electrically from the case 1. Thus, the number of components to be used is reduced; as a result, the cover 36 contributes to a decrease in costs. The second insulating cover 37 has both a function of protecting an ultrasonic-welded section of the negative electrode lead 4 and the negative electrode tab 43a from vibration or impact, and a function of insulating the negative electrode lead 4 and the negative electrode tab 43a electrically from the case 1. Thus, the number of components to be used is reduced; as a result, the cover 37 contributes to a decrease in costs. The first and second insulating covers 36 and 37 protect the ultrasonic-welded sections, whereby the insertion easiness of the electrode group 2 into the case 1 is also improved.

As illustrated in FIG. 8, the first insulating cover 36 is fitted onto the end face of the electrode group 2 from which the positive electrode tab 42a is projected, the U-shaped side plate 36c is put onto the insulating tape 35, and then the insulating cover 36 is fixed onto the insulating tape 35 with an insulating cover fixing tape 38. The second insulating cover 37 is fitted onto the end face of the electrode group 2 from which the negative electrode tab 43a is projected, the U-shaped side plate 37c is put onto the insulating tape 35, and then the insulating cover 37 is fixed onto the insulating tape 35 with the insulating cover fixing tape 38. This structure makes it possible to insulate the electrode group 2, the positive and negative electrode tabs 42a and 43a, and the positive and negative electrode leads 3 and 4 electrically from the case 1 completely. In FIG. 8, the first and second insulating covers 36 and 37 are fixed onto the insulating tape 35 with the insulating cover fixing tapes 38. However, it is allowable to use a method of putting the first and second insulating covers 36 and 37 onto the insulating tape 35 without using the insulating cover fixing tape 38.

Examples of resin that may be used for the first and second insulating covers 36 and 37 include polypropylene, polyimide, polyphenylene sulfide (PPS), and polyesters (such as PET). Polypropylene is particularly desired from the viewpoint of heat resistance, insulating property and costs.

In the meantime, as illustrated in FIGS. 7 and 8, the positive electrode terminal 40 is fitted to the lid 39 by, for example, caulking, with an insulating gasket 45 interposed therebetween. The positive electrode terminal 40 is electrically connected to the positive electrode lead 3 by caulking. In this manner, the positive electrode terminal 40 is electrically connected through the positive electrode lead 3 to the positive electrode 12 of the electrode group 2. The negative electrode terminal 41 is fitted to the lid 39 by, for example, caulking, with an insulating gasket 46 interposed therebetween. The negative electrode terminal 41 is electrically connected to the negative electrode lead 4 by caulking. In this manner, the negative electrode terminal 41 is electrically connected through the negative electrode lead 4 to the negative electrode 13 of the electrode group 2.

The lid 39 is fitted into the opening in the case 1 by, for example, seam-welding through laser. The lid 39 is made of a conductive material such a metal and an alloy. Examples of the conductive material include aluminum, an aluminum alloy, iron and stainless steel. The lid 39 and the case 1 are preferably made of the same kind of material.

According to the battery of the second embodiment described above, the areas opposed to the inside surface of the case 1 which are areas of the positive and negative electrode tabs 42a and 43a and the positive and negative electrode leads 3 and 4 are covered with the first and second insulating covers 36 and 37, which are each a resin molded product. At the same time, the outermost circumference of the electrode group 2 is covered with the insulating tape 35. This makes it possible to insulate the electrode group 2, the positive and negative electrode tabs 42a and 43a, and the positive and negative electrode leads 3 and 4 electrically from the case 1.

Moreover, both the ends of the electrode group 2 are covered with the first and second insulating covers 36 and 37, which are each a resin molded product; thus, the electrode group 2 can be smoothly inserted into the case 1. Furthermore, other areas than both the ends of the electrode group 2 are covered with the insulating tape 35; thus, the volume of the insulating members necessary for the insulation from the case 1 can be made small. As a result, the volume of the electrode group 2 that can be stored in the case 1 can be made high, so that an increase in volume efficiency can be realized. Furthermore, the insertion easiness of the electrode group 2 into the case 1 can be improved. In the insertion thereof into the case 1, therefore, the first and second insulating covers 36 and 37, and the insulating tape 35 can be prevented from being broken. Moreover, the number of components to be used for the insulation from the case be made small.

The second embodiment provides a battery which has a structure in which an electrode group, tabs and leads are electrically insulated from a case, and is high in volume efficiency.

(Third Embodiment)

A battery of a third embodiment has the same structure as the second embodiment except that the structures of the first and second insulating covers of the battery of the second embodiment are changed in order to improve the capability of being impregnated with electrolytic solution, and prevent the breaking of an electrode group inside the battery.

Figure 10:
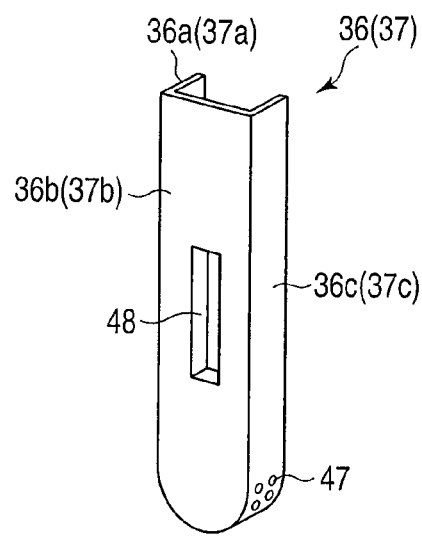
FIG. 10 is a perspective view illustrating first and second insulating covers used in a battery of a third embodiment.

FIG. 10 is a perspective view illustrating a first or second insulating cover used in the battery of the third embodiment. It is preferable for some sealed secondary batteries that the electrode group thereof be impregnated with the electrolytic solution. As for the first and second insulating covers 36 and 37 illustrated in FIGS. 7 and 8, their top ends are the openings 36a and 37a. Thus, an electrolytic solution injected from the injection port in the lid 39 passes through the openings 36a and 37a, so that the electrode group 2 is impregnated with the electrolytic solution. In the meantime, as for the first and second insulating covers 36 and 37, their side plates 36b and 37b are in contact with side faces of the case 1; however, slight spaces are present between the U-shaped side plates 36c and 37c, and the inside surface of the case 1. In order to impregnate the electrode group 2 with the electrolytic solution stored in the spaces, a plurality of electrolytic solution pores 47, which are to be channels between the case 1 and the electrode group 2, are opened in the bottom of the U-shaped side plate 36c or 37c of a first or second insulating cover 36 or 37 illustrated in FIG. 10. This makes it possible to effectively use the electrolytic solution stored between the case 1 and the first or second insulating cover 36 or 37.

As illustrated in FIG. 10, convexes 48 projected inward (toward the electrode group 2) may be formed in the side plates 36b and 37b of the first and second insulating covers 36 and 37, respectively. The convexes 48 are inserted into a gap between portions of the positive electrode tab 42a of the electrode group 2 and a gap between portions of the negative electrode tab 43a thereof, respectively. When the battery is dropped by mistake, the convexes 48 formed in the first and second insulating covers 36 and 37 prevent the electrode group 2 from moving, so that any movement of the electrode group 2 inside the battery can be prevented. As a result, inconvenience can be overcome, such as that the positive and negative electrode tabs 42a and 43a are deformed or damaged to be disconnected from the positive and negative electrode leads 3 and 4, respectively. Thus, the safety of the battery is improved.

In each of the first and second insulating covers 36 and 37, either the electrolytic solution pores 47 or the convex 48 may be formed, or both of the electrolytic solution pores 47 and the convex 48 may be formed as illustrated in FIG. 10.

Prepared were a rectangular nonaqueous electrolyte secondary battery (Example 1) having the same structure as illustrated in FIGS. 7 to 9 except that the first and second insulating covers 36 and 37 illustrated in FIG. 10 were used, and having a size of 100 mm width×20 mm thickness×100 mm height, and a weight of about 500 g, and a rectangular nonaqueous electrolyte secondary battery (Example 2) having the same structure as Example 1 except that no convex was formed. As for each of Examples 1 and 2, a drop test was conducted under the conditions described below. Polypropylene molded products were used for the first and second insulating covers 36 and 37, and polyester was used for the substrate of the insulating tape 35.

In the drop vibration test, each of the secondary batteries was dropped from a height of 10 cm in the state that one of the surfaces of the battery was facing downward. This drop test was conducted for each of the six surfaces of the battery. The operations for the six surfaces were defined as one cycle, which was repeated. The secondary battery of Example 1, in which the convexes 48 were formed, endured 3600 cycles. Example 2, in which no convexes 48 were formed, caused a failure that the positive or negative electrode lead 3 or 4 was disconnected from the positive or negative electrode tab 12a or 13b at the 600$^{th}$ cycle. The same results were verified in the same drop tests except that the height of 10 cm was changed to a height of 1 m.

The third embodiment can provide a battery which has a structure in which an electrode group, tabs and leads are electrically insulated from a case, and is high in volume efficiency.

(Fourth Embodiment)

A battery of a fourth embodiment has the same structure as the second embodiment except that the structures of the electrode group and the insulating tape of the battery of the second embodiment are changed in order to smoothly impregnate the electrode group with the electrolytic solution. In the fourth embodiment, the first and second insulating covers used in the third embodiment may be used.

Figure 11:
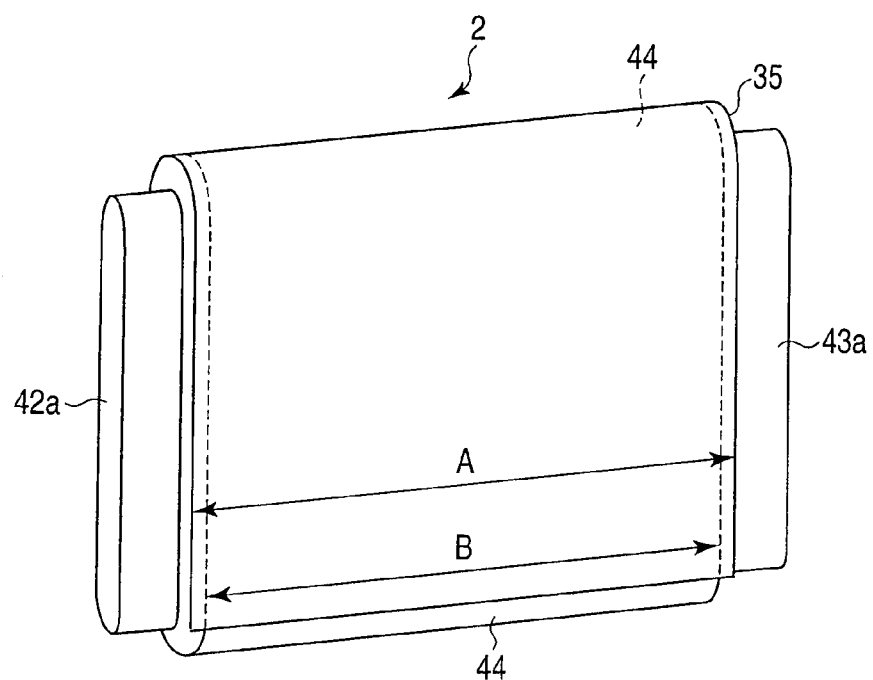
FIG. 11 is a perspective view illustrating an electrode group used in a battery of a fourth embodiment.

As illustrated in FIG. 11, as for a flat-shaped electrode group 2 used in the fourth embodiment, it is desired that the outermost circumference thereof is made of a separator 44. In this manner, the impregnation of an electrolytic solution into the electrode group advances from the outermost circumference 44. It is therefore possible to avoid a problem that the first and second insulating covers 36 and 37, and the insulating tape 35 hinder the impregnation of the electrolytic solution. The separator 44 may be, for example, an olefin-based finely porous membrane, a nonwoven cloth made of olefin-based fiber, or a nonwoven cloth made of cellulose-based fiber. The separator 44 is preferably a separator in which the permeation of the electrolytic solution is easily caused in the separator transverse direction, and is preferably a nonwoven cloth separator.

The short side width A of the insulating tape 35 is adjusted in accordance with the size relationship between the first and second insulating covers 36 and 37, and the insulating cover fixing tapes 38. Basically, it is only necessary for the length A of the insulating tape 35 to cover an area where the electrode section (section where the active material layer is formed on the positive or negative electrode current collector) may contact the case 1. The short side width A of the insulating tape 35 is desirably equal to or more than the short side width B of the separator 44. This makes it possible to cover the separator 44 with the insulating tape 35, which has a higher mechanical strength than the separator 44, so as to decrease damage to the separator 44 when the insulating tape is bonded onto the electrode group. In addition, favorably, the bonding of the insulating cover fixing tape 38 can be roughly performed. It is desired that the short side width A of the insulating tape 35 is set to such a length that any long side of the insulating tape 35 does not overlap with the positive or negative electrode tab 42a or 43a, in order for the insulating tape 35 not to hinder welding between the positive electrode lead 3 and the positive electrode tab 42a, or between the negative electrode lead 4 and the negative electrode tab 43a.

It is only necessary for the thickness of the substrate of the insulating tape 35 to secure the insulation of the electrode group 2 from the case. If the substrate becomes thick, the capacity is decreased due to a decrease in the volume of the electrode group. Thus, the thickness is preferably in a range of 0.012 to 0.2 mm, more preferably in a range of 0.025 to 0.2 mm.

Figure 12:
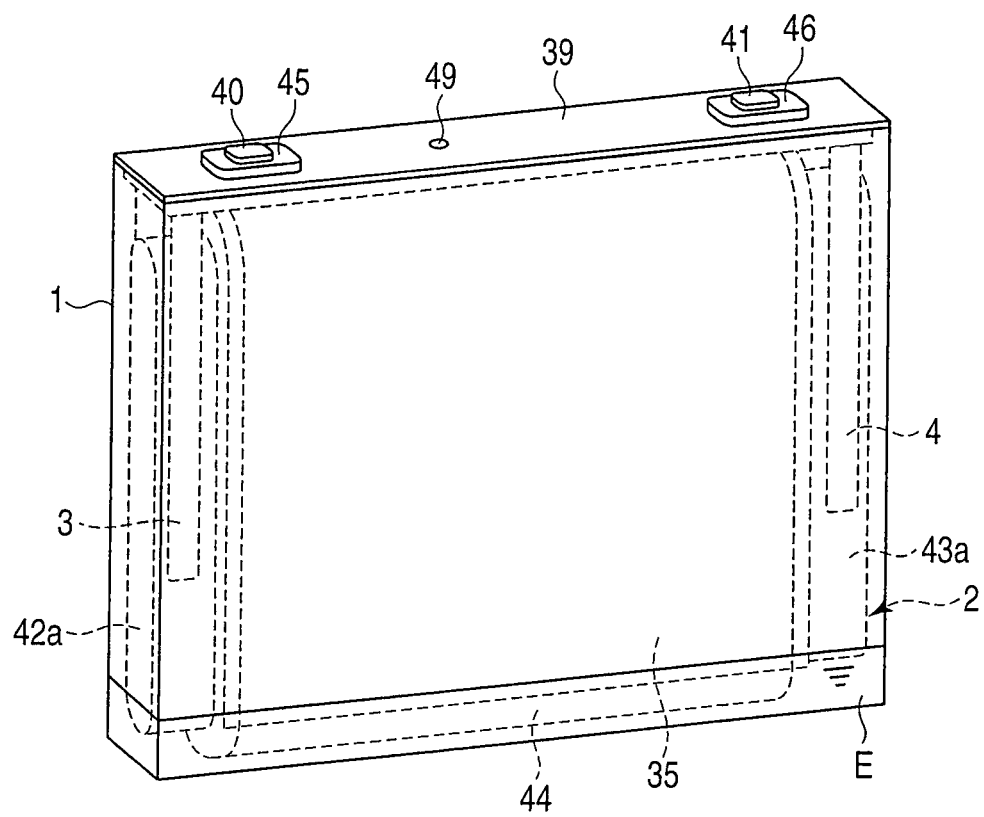
FIG. 12 is a perspective view schematically illustrating a state that an electrolytic solution is contained into the case of the battery according to the fourth embodiment.

In the first and second embodiments, the outermost circumference of the electrode group 2 is covered with one or more circumferences of the insulating tape 35, but may be covered with less than one circumference thereof. In this case, the outermost circumference of the electrode group 2 is occupied by the separator 44 in order to insulate the outermost circumference of the electrode group 2. The outermost circumferential section of the electrode group 2 made uncovered is preferably located at a side of the battery which is opposite to the injection port and a pool of an electrolytic solution is made when the solution is injected. Even when the uncovered section is located at the injection port side, the uncovered section fulfils a function for impregnation of the electrolytic solution into the electrode group. However, at the time of the impregnation, the electrolytic solution needs to be made close to the injection port side. At this time, a work for reversing the posture of the cell and other complicated works are required. Moreover, it is essential that the uncovered section of the electrode group 2 be the separator 44 in order to keep the insulation of the electrode group 2 from the case 1. As illustrated in, for example, FIG. 11, it is desired that the section of the electrode group 2 that is opposed to the bottom surface of the case 1 is not covered with the insulating tape 35 to make the separator 44 of the outermost circumference uncovered. FIG. 12 is a perspective view illustrating a situation that the electrode group in FIG. 11 is stored in the case 1 in the state that the electrode group is not covered with the first or second insulating cover 36 or 37 for the sake of convenience for the description of the step of impregnation of an electrolytic solution. After the electrode group 2 is inserted into the case 1 and then the lid 39 is welded to the opening in the case 1, the electrolytic solution is injected through an injection port 49 made in the lid 39. Although the electrode group 2 is impregnated with part of the electrolytic solution, the remaining electrolytic solution E is collected into the bottom of the case 1. In the state that the electrolytic solution E is collected in the bottom, the pressure in the case 1 is repeatedly increased or decreased, or the battery is allowed to stand still; thus, the electrode group 2 is impregnated with the electrolytic solution E. At this time, the electrode group 2 is impregnated with the electrolytic solution E through the uncovered section of the separator 44 that is the outermost circumference of the electrode group 2. Thus, it is necessary that the uncovered section of the separator 44 contact the electrolytic solution collected after the injection of the electrolytic solution.

According to the above-mentioned structure, the number of insulating members to be used can be made small. Thus, it is possible to avoid an increase in the volume of the insulating members and a bad effect onto battery-downsizing, and further improve the battery capability of being impregnated with electrolytic solution to make the productivity of batteries high.

The fourth embodiment can provide a battery which has a structure in which an electrode group, tabs and leads are electrically insulated from a case, and is high in volume efficiency.

(Fifth Embodiment)

Figure 13:
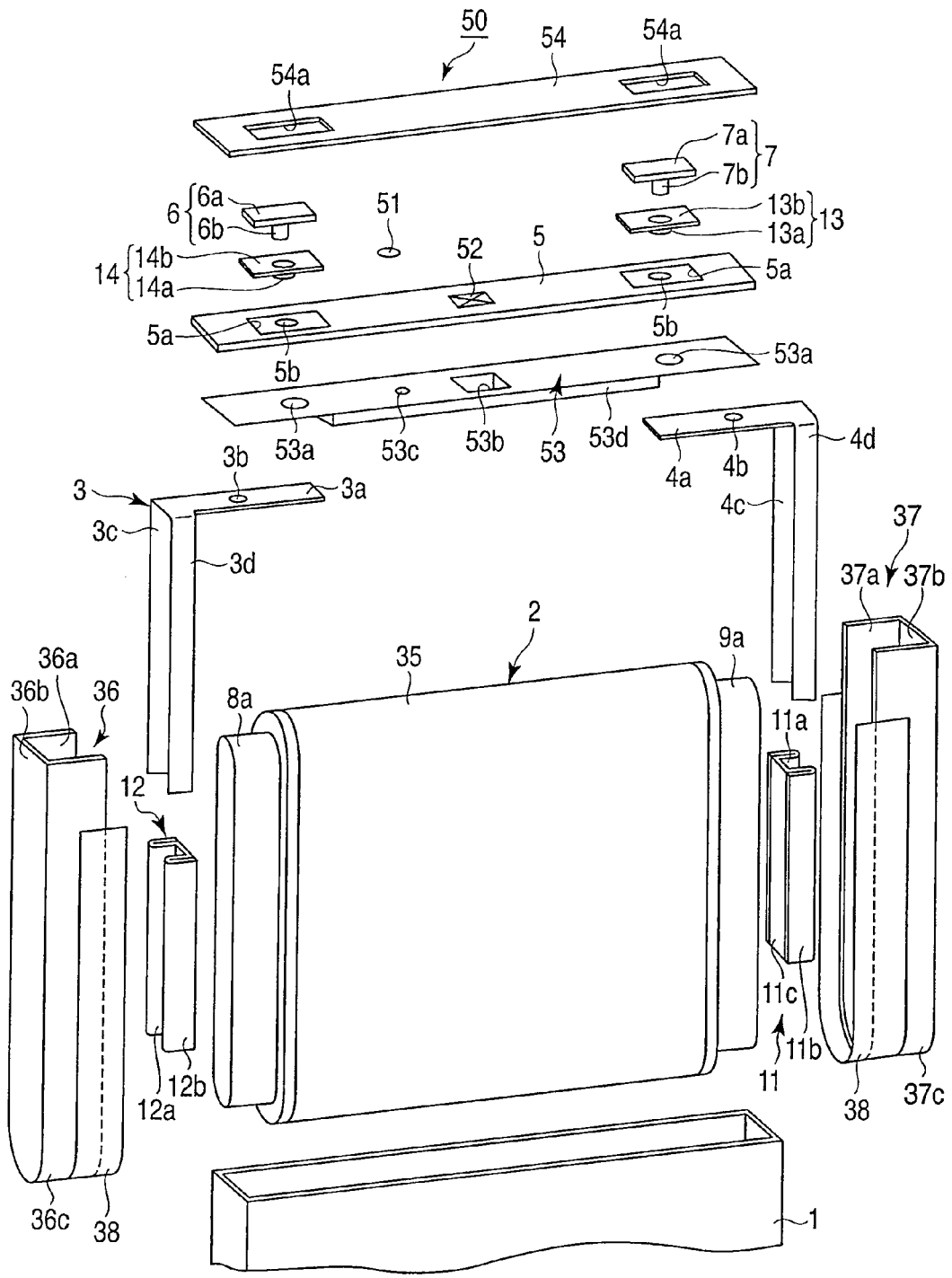
FIG. 13 is a partially-exploded perspective view of a battery of a fifth embodiment.

The battery according to the first embodiment may comprise either the first and second insulating members of the battery according to the second or third embodiment, or the electrode group and the insulating tape of the battery according to the fourth embodiment. A form of a battery according to a fifth embodiment is illustrated in FIG. 13. To the same members as those illustrated in FIGS. 1 to 12 are attached the same reference numbers, respectively, and description thereof is omitted.

A battery 50 illustrated in FIG. 13 is a sealed, rectangular, nonaqueous electrolyte secondary battery. The battery 50 comprises a case 1, a flat-shaped electrode group 2 stored in the case 1, positive and negative electrode leads 3 and 4 positioned in the case 1, an insulating tape 35 covering the outermost circumference of the electrode group 2, a first insulating cover 36, a second insulating cover 37, an insulating cover fixing tape 38, a lid 5 provided to an opening in the case 1, and positive and negative electrode terminals 6 and 7 provided on the lid 5. The electrode group 2 is impregnated with an electrolytic solution (not illustrated).

The positive electrode lead 3 comprises a connecting plate 3a to be connected electrically to the positive electrode terminal 6, a through hole 3b made in the connecting plate 3a, and strip-form current collecting sections 3c and 3d that are two sections branched from the connecting plate 3a so as to extend downward. The negative electrode lead 4 comprises a connecting plate 4a to be connected electrically to the negative electrode terminal 7, a through hole 4b made in the connecting plate 4a, and strip-form current collecting sections 4c and 4d that are two sections branched from the connecting plate 4a so as to extend downward.

The positive electrode tab 8a is divided into two bundles in each of which portions of the tab are laminated onto each other in the thickness direction of the electrode group 2. A conductive positive electrode nipping member 12 nips and holds each of the bundles of the portions of the positive electrode tab 8a. The negative electrode tab 9a is divided into two bundles in each of which portions of the tab are laminated onto each other in the thickness direction of the electrode group 2. A conductive negative electrode nipping member 11 nips and holds each of the bundles of the portions of the negative electrode tab 9a.

As for the positive electrode lead 3, the positive electrode nipping member 12 is sandwiched between its current collecting sections 3c and 3d. The current collecting section 3c is arranged on the outside surface of a first nipping section 12a of the positive electrode nipping member 12. The current collecting section 3d is arranged on the outside surface of a second nipping section 12. The first and second nipping sections 12a and 12b, the positive electrode tab 8a, and the current collecting sections 3c and 3d are welded to each other by, for example, ultrasonic welding. In this manner, a positive electrode 8 of the electrode group 2 is electrically connected through the positive electrode tab 8a to the positive electrode lead 3.

As for the negative electrode lead 4, the negative electrode nipping member 11 is sandwiched between its current collecting sections 4c and 4d. The current collecting section 4c is arranged on the outside surface of a first nipping section 11a of the negative electrode nipping member 11. The current collecting section 4d is arranged on the outside surface of a second nipping section 11b. The first and second nipping sections 11a and 11b, the negative electrode tab 9a, and the current collecting sections 4c and 4d are welded to each other by, for example, ultrasonic welding. In this manner, a negative electrode 9 of the electrode group 2 is electrically connected through the negative electrode tab 9a to the negative electrode lead 4.

The adhesive insulating tape 35 insulates the outermost circumference of the electrode group 2 electrically from the case 1.

The first insulating cover 36 is a resin molded product having a shape covering areas of the positive electrode lead 3, the positive electrode nipping member 12 and the positive electrode tab 8a that are areas opposed to the inside surface of the case 1. Specifically, the first insulating cover 36 comprises an opening 36a opposed to the inside surface of the lid 5, a side plate 36b covering the end face of the positive electrode tab 8a, and a side plate 36c curved into a U-shaped form to cover the outermost circumference of the positive electrode tab 8a.

The second insulating cover 37 is a resin molded product having a shape covering areas of the negative electrode lead 4, the negative electrode nipping member 11 and the negative electrode tab 9a that are areas opposed to the inside surface of the case 1. Specifically, the second insulating cover 37 comprises an opening 37a opposed to the inside surface of the lid 5, a side plate 37b covering the end face of the negative electrode tab 9a, and a side plate 37c curved into a U-shaped form to cover the outermost circumference of the negative electrode tab 9a.

The first insulating cover 36 has both a function of protecting ultrasonic-welded sections of the positive electrode lead 3, the positive electrode nipping member 12, and the positive electrode tab 8a from vibration or impact, and a function of insulating the positive electrode lead 3, the positive electrode nipping member 12 and the positive electrode tab 8a electrically from the case 1. Thus, the number of components to be used is reduced; as a result, the cover 36 contributes to a decrease in costs. The second insulating cover 37 has both a function of protecting ultrasonic-welded sections of the negative electrode lead 4, the negative electrode nipping member 11, and the negative electrode tab 9a from vibration or impact, and a function of insulating the negative electrode lead 4, the negative electrode nipping member 11 and the negative electrode tab 9a electrically from the case 1. Thus, the number of components to be used is reduced; as a result, the cover 37 contributes to a decrease in costs. The first and second insulating covers 36 and 37 protect the ultrasonic-welded sections, whereby the insertion easiness of the electrode group 2 into the case 1 is also improved.

The first insulating cover 36 is fitted onto the end face of the electrode group 2 from which the positive electrode tab 8a is projected, the U-shaped side plate 36c is put onto the insulating tape 35, and then the first insulating cover 36 is fixed onto the insulating tape 35 with the insulating cover fixing tape 38. The second insulating cover 37 is fitted onto the end face of the electrode group 2 from which the negative electrode tab 9a is projected, the U-shaped side plate 37c is put onto the insulating tape 35, and then the insulating cover 37 is fixed onto the insulating tape 35 with the insulating cover fixing tape 38. This structure makes it possible to insulate the electrode group 2, the positive and negative electrode tabs 8a and 9a, the positive and negative electrode nipping members 11 and 12, and the positive and negative electrode leads 3 and 4 electrically from the case 1. It is allowable to put the first and second insulating covers 36 and 37 onto the insulating tape 35 without using the insulating cover fixing tapes 38.

The lid 5 having a rectangular plate form is fitted to the opening in the case 1 by, for example, seam-welding through laser. An injection port (not illustrated) for electrolytic solution is made in the lid 5. After an electrolytic solution is injected into the case, the injection port is sealed with a sealing lid 51. Two rectangular concaves 5a are made in the outside surface of the lid 5. The positive electrode terminal 6 is stored in one of the concaves 5a, and the negative electrode terminal 7 is stored in the other concave 5a. A single through hole 5b is made in each of the concaves 5a. A safety valve 52 is arranged between the concaves 5a on the outside surface of the lid 5. The safety valve 52 comprises a rectangular concave, and a groove made inside the concave. When the pressure in the case 1 reaches a standard value or more, the groove is broken by the pressure so that gas is released outside through the broken site. Thus, the rupture of the battery is prevented.

An internal insulator 53 is arranged on the rear surface of the lid 5. The internal insulator 53 comprises a through hole 53a made at a position opposed to the through hole 5b in the lid 5, a gas releasing hole 53b made at a position opposed to the safety valve 52, and an injection port 53c. A spacer 53d is disposed on the rear surface of the internal insulator 53, that is, the surface thereof opposed to the electrode group 2. The spacer 53d can inhibit the electrode group 2 from moving to approach the lid 5.

A positive electrode insulating gasket 14 comprises a cylindrical section 14a in the form of a circular cylinder, and a flange section 14b formed in a flange form at one opening end of the cylindrical section 14a. A negative electrode insulating gasket 13 comprises a cylindrical section 13a in the form of a circular cylinder, and a flange section 13b formed in a flange form at one opening end of the cylindrical section 13a. The cylindrical sections 13a and 14a are inserted into the through holes 5b in the concaves 5a in the lid 5, respectively. The lower opening ends thereof are inserted into the through holes 53a in the internal insulator 53, respectively. The flange sections 13b and 14b cover the circumferential edges of the through holes 5b inside the concaves 5a in the lid 5, respectively.

The positive electrode terminal 6 comprises a head section 6a, and an axial section 6b extended downward from the head section 6a. The head section 6a of the positive electrode terminal 6 is stored in the flange section 14b of the insulating gasket 14. The negative electrode terminal 7 comprises a head section 7a, and an axial section 7b extended downward from the head section 7a. The head section 7a of the positive electrode terminal 7 is stored in the flange section 13b of the insulating gasket 13.

The axial section 6b of the positive electrode terminal 6 is inserted into the cylindrical section 14a of the insulating gasket 14, the through hole 5b in the lid 5 and the through hole 53a in the internal insulator 53. The tip of the axial section 6b is inserted in the through hole 3b in the positive electrode lead 3. The axial section 3b is deformed by caulking, so as to be enlarged in diameter, and is fixed to the lid 5, the internal insulator 53 and the positive electrode lead 3. The axial section 7b of the negative electrode terminal 7 is inserted into the cylindrical section 13a of the insulating gasket 13, the through hole 5b in the lid 5 and the through hole 53a in the internal insulator 53. The tip of the axial section 7b is inserted in the through hole 4b in the negative electrode lead 4. The axial section 7b is deformed by caulking, so as to be enlarged in diameter, and is fixed to the lid 5, the internal insulator 53 and the negative electrode lead 4. In this manner, the positive and negative electrode terminals 6 and 7 are fixed to the lid 5 in the state that electric insulation therebetween and air-tightness therein are certainly kept. Furthermore, the positive and negative electrode terminals 6 and 7 are fixed to the positive and negative electrode leads 3 and 4, respectively, in the state that electric connection is certainly kept therebetween.

The insulating cover 54 comprises, at positions thereof opposed to the positive and negative electrode terminals 6 and 7, through holes 54a, respectively. The insulating cover 54 is arranged on the lid 5 such that the head sections 6a and 7a of the positive and negative electrode terminals 6 and 7 are projected from the through holes 54a, respectively.

As for the nonaqueous electrolyte secondary battery having the structure illustrated in FIG. 13, the flowing electric current limit thereof was checked at the time of pulse charging and discharging operations. Results described below were obtained.

The used positive electrode active material was lithium cobalt oxide ($LiCoO_2$), and the used negative electrode active material was a negative electrode active material having a lithium-adsorbing potential corresponding to an open circuit potential of 0.4 V or more relative to the open circuit potential of the metallic lithium. Nonaqueous electrolyte was used as the electrolytic solution. An aluminum alloy was used for the case 1, the lid 5, the positive and negative electrode terminals 6 and 7, the positive and negative electrode tabs 8a and 9a, the positive and negative electrode leads 3 and 4, and the positive and negative electrode nipping members 11 and 12. A polypropylene molded product was used as the first and second insulating covers 36 and 37, and polyester was used for the substrate of the insulating tape 35.

A pulse current was used to charge and discharge the battery repeatedly. The cell temperature at the time was measured. The value of the current flowing therein was started from 100 A. Until the cell temperature exceeded 100° C. or the measured voltage got out of the range of the predetermined voltage (the range of 1.5 to 2.95 V), the current was raised step by step. A specific method for evaluating the battery will be described hereinafter.

Figure 14:
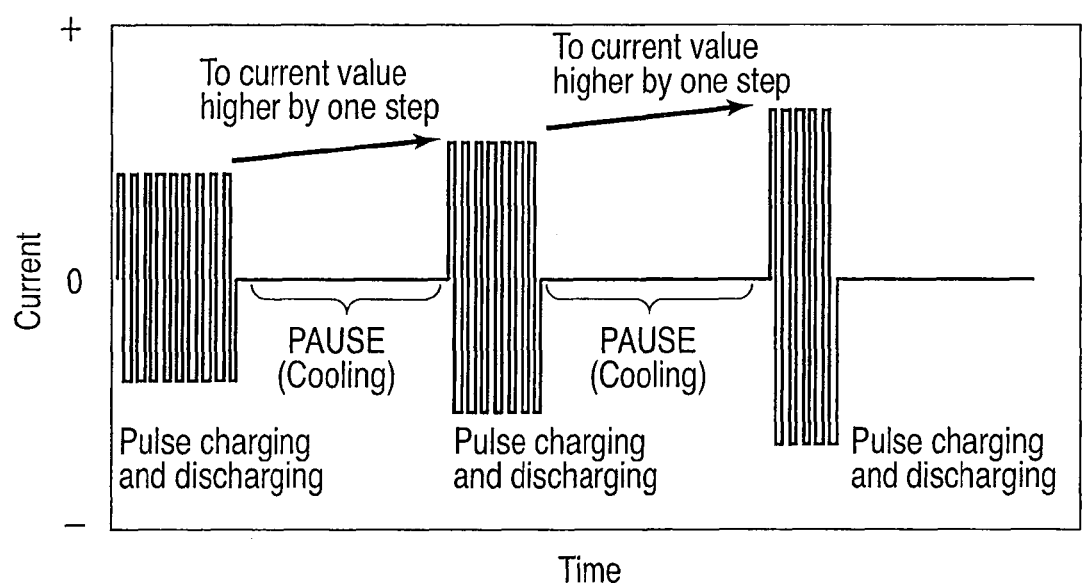
FIG. 14 is a chart showing a program of a pulse charging and discharging test.
Figure 15:
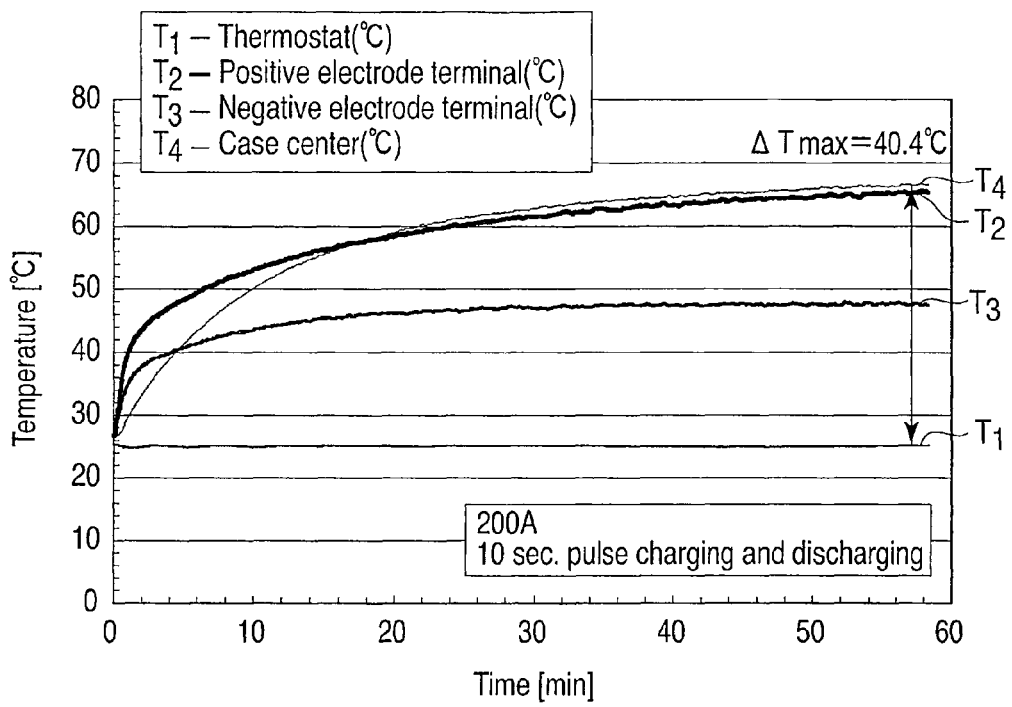
FIG. 15 is a graph showing a change with time in the temperature of each of a thermostat, a positive electrode terminal, a negative electrode terminal and the center of a case in pulse charging and discharging operations in STEP 4.
Figure 16:
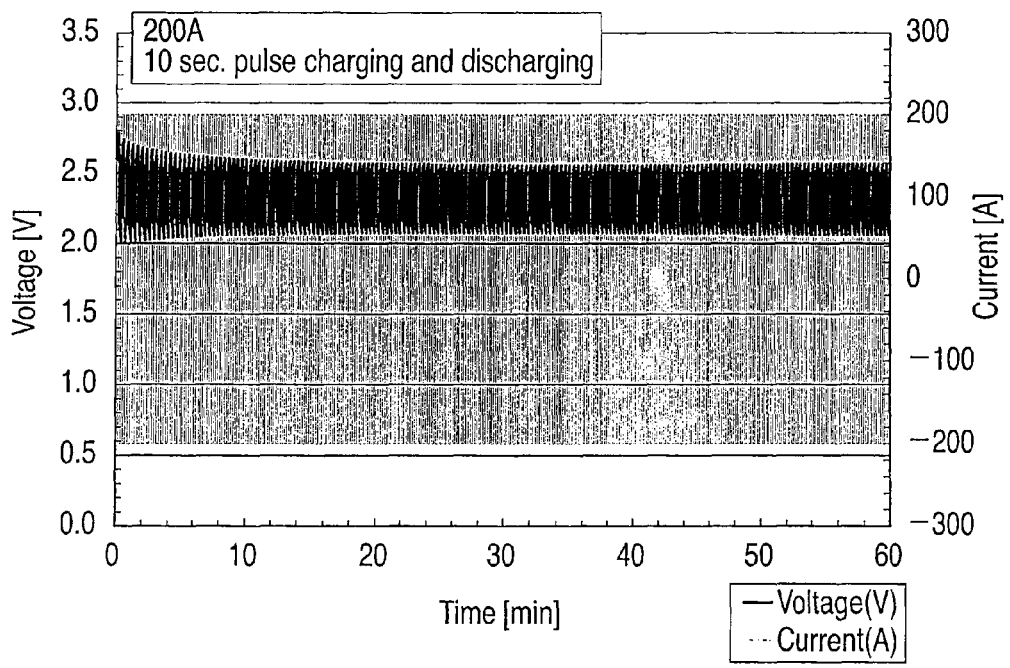
FIG. 16 is a graph showing a change with time in the current and the voltage of a cell in the pulse charging and discharging operations in STEP 4.
Figure 17:
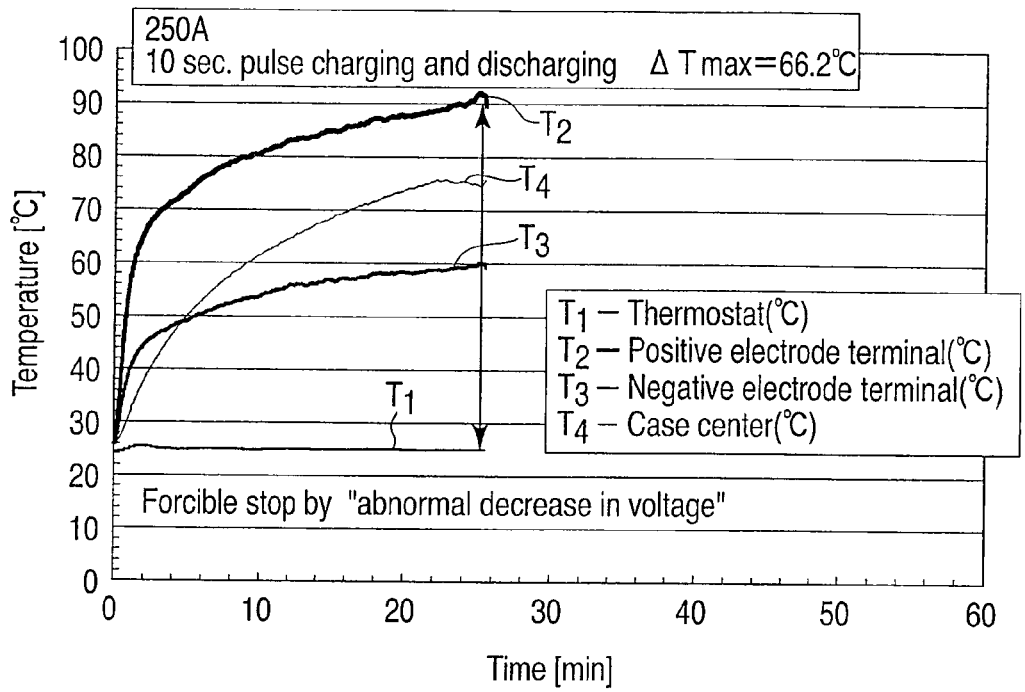
FIG. 17 is a graph showing a change with time in the temperature of each of a thermostat, a positive electrode terminal, a negative electrode terminal and the center of a case in pulse charging and discharging operations in STEP 5.
Figure 18:
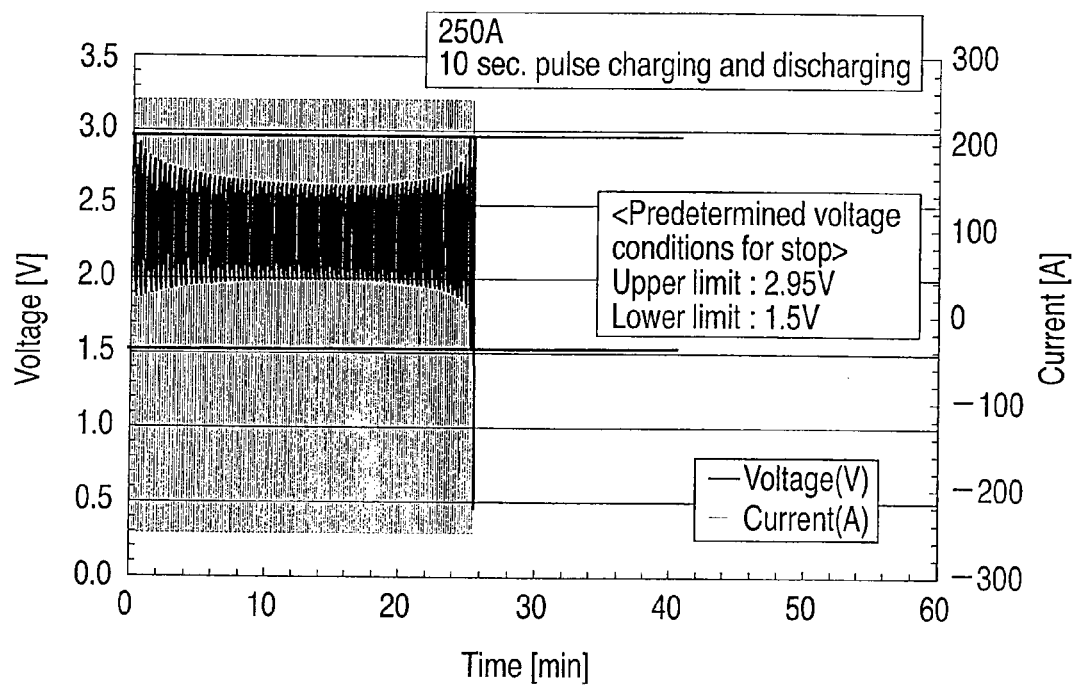
FIG. 18 is a graph showing a change with time in the current and the voltage of a cell in the pulse charging and discharging operations in STEP 5.

As illustrated in FIG. 14, a pulse charging and discharging test was performed. Specifically, in the test, while the current value was raised step by step, pulse charging and discharging operations were performed plural times and a predetermined pause period was set between the pulse charging and discharging operations. Under an initial condition that the SOC set was 500, the pulse charging and discharging operations were performed at intervals of 10 seconds. The pulse charging and discharging operations were performed while the current value was raised step by step from STEP 1 to STEP 5. The current value of each of STEP 1 to STEP 5 is shown in Table 1. As for the current value of each of the STEPs in Table 1, a value indicated with the unit of A is shown and a value obtained by converting the value into the rate of the unit of C is shown in parentheses. The pulse charging and discharging operation in each of the STEPs was set to a predetermined period within the range of 40 to 60 minutes. The pause period was set between the individual STEPs. When the cell temperature reached 100° C., or the measured voltage got out of the range of the predetermined voltage (the range of 1.5 to 2.95 V), the charging and discharging operation was stopped. When the cell temperature was lowered after the stopping so as to settle to the environment temperature, a pulse charging and discharging operation was again carried out at the current value higher by one stage. At the time of the pulse charging and discharging operations, the current, the voltage, the time, and the temperature at four points (the thermostat, the positive electrode terminal, the negative electrode terminal, and the center of the case) were measured. In Table 2 and FIGS. 15 to 18 are shown the test results obtained when STEPs 1 to 5 were carried out, that is, when the pulse charging and discharging test was made while a current of 100 A to at most 250 A was flowed to the battery. FIG. 15 shows a change with time in the temperature of each of the thermostat, the positive electrode terminal, the negative electrode terminal, and the case center in the pulse charging and discharging in STEP 4 (200 A). FIG. 16 shows a change with time in each of the current and the voltage of the cell in the pulse charging and discharging in STEP 4 (200 A). FIG. 17 shows a change with time in the temperature of each of the thermostat, the positive electrode terminal, the negative electrode terminal, and the case center in the pulse charging and discharging in STEP 5 (250 A). FIG.

18 shows a change with time in each of the current and the voltage of the cell in the pulse charging and discharging in STEP 5 (250 A). In FIGS. 15 and 17, the temperature of the thermostat, that of the positive electrode terminal, that of the negative electrode terminal, and that of the case center are represented by $T_1$, $T_2$, $T_3$ and $T_4$, respectively. In FIG. 2, a measuring point of the temperature of the positive electrode terminal, that of the negative electrode terminal, and that of the case center are represented by $\alpha$, $\beta$, and $\gamma$, respectively.

TABLE 1

| STEP No. | STEP1 | STEP2 | STEP3 | STEP4 | STEP5 |
|---|---|---|---|---|---|
| Flowing current | 100A (5C) | 130A (7C) | 160A (8C) | 200A (10C) | 250A (13C) |

TABLE 2

| | $\Delta T_{max}$: Difference between highest temperature and temperature before evaluation | | |
|---|---|---|---|
| Flowing current [A] | Positive electrode terminal (° C.) | Negative electrode terminal (° C.) | Case center (° C.) |
| 100 | 7.3 | 5.3 | 11.6 |
| 130 | 13.1 | 9.6 | 18.0 |
| 160 | 21.6 | 15.3 | 27.2 |
| 200 | 38.9 | 21.3 | 40.4 |
| 250 | 66.2 | 34.5 | 49.7 |

As is evident from Table 2, at a pulse current of 100 A, the difference between the temperature before the evaluation and the highest temperature was largest at the case center, and was 11.6° C. At a pulse current of 130 A, the difference between the temperature before the evaluation and the highest temperature was largest at the case center, and was 18.0° C. At a pulse current of 160 A, the difference between the temperature before the evaluation and the highest temperature was largest at the case center, and was 27.2° C.

As is evident from FIGS. 15 and 16, in the battery according to the fifth embodiment, a pulse current of 200 A was permitted to flow in the battery for 60 minutes or more. As shown in Table 2, the difference between the temperature before the evaluation and the highest temperature was largest at the case center, and was 40.4° C. As is evident from FIGS. 17 and 18, when a current of 250 A was caused to flow in the battery, the measured voltage was less than 1.5 V, which was the lower limit of the predetermined voltage range (i.e., a charging and discharging stopping condition). Therefore, at this time, the evaluation was forcibly ended. As shown in Table 2, as for temperature rises of the measured points, the difference between the temperature before the evaluation and the highest temperature was largest at the positive electrode terminal, and was 66.2° C. Even when a large current of 250 A was caused to flow in the battery, a problem of heat generation was not caused. In the predetermined voltage range (of 1.5 to 2.9 V), a pulse current of 250 A was permitted to flow in the battery for 25 minutes.

The fifth embodiment can provide a battery having a structure making it possible that a large volume of a flat-shaped electrode group is stored in a case to give a high energy density, and further the resistances of connecting sections of positive and negative electrode leads, and others are restrained to collect electricity efficiently. Additionally, the fifth embodiment can make an improvement in the volume efficiency of a battery having a structure in which an electrode group, tabs and leads are insulated electrically from a case.

In the second to fifth embodiments, the same positive and negative electrode terminal materials, positive electrode, negative electrode, separators, and electrolytic solution as those described in the first embodiment may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
   an electrode group in which a positive electrode and a negative electrode are wound into a flat form with a separator interposed therebetween, the positive electrode comprising a positive electrode current collector, and the negative electrode comprising a negative electrode current collector;
   a positive electrode tab which is a section of the positive electrode current collector projected from one end face of the electrode group, the positive electrode tab having a spiral form with a gap;
   a negative electrode tab which is a section of the negative electrode current collector projected from the other end face of the electrode group, the negative electrode tab having a spiral form with a gap;
   a case in which the electrode group is stored;
   a lid provided to an opening in the case and comprising a positive electrode terminal and a negative electrode terminal;
   a positive electrode lead in which one end is electrically connected to the positive electrode terminal, and the other end is electrically connected to the positive electrode tab;
   a negative electrode lead in which one end is electrically connected to the negative electrode terminal, and the other end is electrically connected to the negative electrode tab;
   an insulating tape which is arranged on an outermost circumference of the electrode group;
   a first insulating cover comprising a resin molded product having a shape which covers areas of the positive electrode lead and the positive electrode tab which are areas opposed to an inside surface of the case;
   a second insulating cover comprising a resin molded product having a shape which covers areas of the negative electrode lead and the negative electrode tab which are areas opposed to the inside surface of the case;
   the first insulating cover comprising a convex inserted into the gap of the positive electrode tab; and
   the second insulating cover comprising a convex inserted into the gap of the negative electrode tab.

2. The battery according to claim 1, wherein the insulating tape covers the outermost circumference of the electrode group, so as to form one or more tape circumferential surfaces on the outermost circumference.

3. The battery according to claim 1, wherein the first insulating cover comprises a hole which is a channel between the case and the electrode group.

4. The battery according to claim 1, wherein the second insulating cover comprises a hole which is a channel between the case and the electrode group.

5. The battery according to claim 1, wherein the outermost circumference of the electrode group is occupied by a portion of the separator.

6. The battery according to claim 5, wherein a short side width of the insulating tape is equal to or larger than a short side width of the separator.

7. The battery according to claim 5, wherein the insulating tape covers a partial area of the separator of the outermost circumference of the electrode group.

8. The battery according to claim 7, further comprising an electrolytic solution contained in the case.

9. The battery according to claim 8, wherein an uncovered section of the separator is located to contact the electrolytic solution.

10. The battery according to claim 1, wherein the insulating tape comprises a substrate, and the substrate has a thickness falling within a range of 0.012 to 0.2 mm.

\* \* \* \* \*